(12) United States Patent
Ohtani et al.

(10) Patent No.: US 11,283,810 B2
(45) Date of Patent: Mar. 22, 2022

(54) COMMUNICATION CONTROL METHOD AND COMMUNICATION CONTROL DEVICE FOR SUBSTITUTING SECURITY FUNCTION OF COMMUNICATION DEVICE

(71) Applicant: FUJITSU LIMITED, Kawasaki (JP)

(72) Inventors: Takeshi Ohtani, Kawasaki (JP); Ryuichi Matsukura, Kawasaki (JP); Jun Kakuta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 304 days.

(21) Appl. No.: 16/254,335

(22) Filed: Jan. 22, 2019

(65) Prior Publication Data

US 2019/0253432 A1 Aug. 15, 2019

(30) Foreign Application Priority Data

Feb. 9, 2018 (JP) .............................. JP2018-022523

(51) Int. Cl.
*H04L 29/06* (2006.01)
*H04L 12/66* (2006.01)

(52) U.S. Cl.
CPC ............ *H04L 63/105* (2013.01); *H04L 12/66* (2013.01); *H04L 63/0823* (2013.01); *H04L 63/0884* (2013.01); *H04L 63/102* (2013.01); *H04L 63/1408* (2013.01); *H04L 63/1425* (2013.01)

(58) Field of Classification Search
None
See application file for complete search history.

(56) References Cited

U.S. PATENT DOCUMENTS

2004/0153673 A1* 8/2004 Kitano .................. H04L 41/046
713/152

FOREIGN PATENT DOCUMENTS

| JP | 2004-005170 A |   | 1/2004 |
|----|---------------|---|--------|
| JP | 2015-069227 A |   | 4/2015 |
| JP | 2017-046179 A |   | 3/2017 |
| JP | 2017046179 A  | * | 3/2017 |

OTHER PUBLICATIONS

Japanese Office Action issued by the Japanese Patent Office in related Japanese Patent Application No. 2018-022523, dated Sep. 14, 2021.

* cited by examiner

*Primary Examiner* — Andrew J Steinle
(74) *Attorney, Agent, or Firm* — Arent Fox LLP

(57) ABSTRACT

A communication control method executed by a processor included in a communication control device that controls communication with a communication device, the method includes, when a communication access to the communication device is detected, specifying a related characteristic corresponding to the communication device by referring to a first memory that stores communication device-related characteristics, determining a security function corresponding to the specified related characteristic by referring to a second memory that stores executable security functions for the communication device-related characteristics, and executing the security function determined at the determining for the communication device of the communication access.

8 Claims, 32 Drawing Sheets

FIG. 4

| IDENTI-FIER | IDENTIFICATION INFORMATION | AUTHENTICATION FUNCTION | VERIFI-CATION FUNC-TION | LOGGING FUNC-TION | COMMU-NICATION SCHEME |
|---|---|---|---|---|---|
| device#1 | VENDOR NAME : vvvv<br>PRODUCT NAME : aaaa | ABSENT | ABSENT | ABSENT | AdapterA |
| device#2 | VENDOR NAME : uuuu<br>PRODUCT NAME : bbbb | DEFAULT ID/PW | ABSENT | PRESENT | AdapterB |
| device#3 | VENDOR NAME : wwww<br>PRODUCT NAME : cccc | SETTING COMPLETED ID/PW | PRESENT | PRESENT | AdapterC |
| ~ | ~ | ~ | ~ | ~ | ~ |

| IDENTI-FIER | IDENTIFICATION INFORMATION | DEVICE TYPE | DEVICE USAGE | LATEST PATCH APPLICA-TION | COMMUNI-CATION SCHEME |
|---|---|---|---|---|---|
| device#4 | VENDOR NAME : vvvv PRODUCT NAME : aaaa | ACTUATOR SYSTEM | CONTROL SYSTEM | ABSENT | AdapterA |
| device#5 | VENDOR NAME : uuuu PRODUCT NAME : bbbb | SENSOR SYSTEM | VISUALIZ-ATION SYSTEM | ABSENT | AdapterB |
| device#6 | VENDOR NAME : wwww PRODUCT NAME : cccc | SENSOR SYSTEM | CONTROL SYSTEM | PRESENT | AdapterC |
| ~ | ~ | ~ | ~ | ~ | ~ |

67

| CONDI-TIONS (LOAD) | CONDI-TIONS (THREAT DEGREE) | CONDITIONS (IMPORTANCE) | | |
|---|---|---|---|---|
| | | HIGH LEVEL | MEDIUM LEVEL | LOW LEVEL |
| AB-NORMAL STATE | HIGH LEVEL | CERTIFICATE AUTHENTICATION | CERTIFICATE AUTHENTICATION | ID/PW |
| | MEDIUM LEVEL | CERTIFICATE AUTHENTICATION | ID/PW | ID/PW |
| | LOW LEVEL | ID/PW | ID/PW | EXECUTION BY COMMUNICATION DEVICE |
| NORMAL STATE | HIGH LEVEL | CERTIFICATE AUTHENTICATION | ID/PW | EXECUTION BY COMMUNICATION DEVICE |
| | MEDIUM LEVEL | ID/PW | EXECUTION BY COMMUNICATION DEVICE | EXECUTION BY COMMUNICATION DEVICE |
| | LOW LEVEL | EXECUTION BY COMMUNICATION DEVICE | EXECUTION BY COMMUNICATION DEVICE | EXECUTION BY COMMUNICATION DEVICE |

COMMUNICATION CONTROL METHOD AND COMMUNICATION CONTROL DEVICE FOR SUBSTITUTING SECURITY FUNCTION OF COMMUNICATION DEVICE

CROSS-REFERENCE TO RELATED APPLICATION

This application is based upon and claims the benefit of priority of the prior Japanese Patent Application No. 2018-022523, filed on Feb. 9, 2018, the entire contents of which are incorporated herein by reference.

FIELD

The embodiments discussed herein are related to a communication control method and a communication control device.

BACKGROUND

The Internet of Thing (IoT) services that collect a large amount of data by connecting communication devices such as sensors to the Internet and analyze/visualize the data or use the data for communication device control have been widely distributed recently. There are many IoT devices (hereinafter simply referred to as devices) with no security function.

There are also many devices with security functions that are being operated without changing an initial password. In recent years, malware that illegally logs in to the products of surveillance cameras and NW devices that had been operating with an initial password without changing the initial password has become popular. The initial password can be easily acquired by referring to the product manuals published on the Internet or by actually examining the products. In addition, since the information on the devices connected to the Internet is disclosed by search engines, it is easy to find out a device which is not being operated securely. Therefore, malicious third party may illegally and easily access the device to perform various attacks such as illegal use and tampering.

For example, in a case where a device used in an industrial field such as a manufacturing industry suffers from such an attack, there is a risk of, for example, stoppage of a production line or failure of a production facility. Therefore, there is a need for a way to prevent attacks against devices.

Thus, there has been recently known a method of arranging a Gateway (GW) that relays communication between an office area to which, for example, NW devices which have been securely managed are connected, and a field area to which devices which have not been securely managed are connected. For example, when an access from an application to a device is detected, the GW controls the illegal access to the device by executing a security function such as an authentication function on behalf of the device. As a result, the GW can substitute an advanced security function for existing commercial devices without requiring modification or special setting of the devices. The advanced security function substituted by the GW may include, for example, an authentication function such as an authentication certificate, a verification function for verifying the validity of a message, or a detailed log function for recording a detailed log.

Related techniques are disclosed in, for example, Japanese Laid-open Patent Publication Nos. 2017-046179 and 2004-005170.

SUMMARY

According to an aspect of the embodiments, a communication control method executed by a processor included in a communication control device that controls communication with a communication device, the method includes, when a communication access to the communication device is detected, specifying a related characteristic corresponding to the communication device by referring to a first memory that stores communication device-related characteristics, determining a security function corresponding to the specified related characteristic by referring to a second memory that stores executable security functions for the communication device-related characteristics, and executing the security function determined at the determining for the communication device of the communication access.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is an explanatory view illustrating an example of a first device table;

FIG. 22 is an explanatory view illustrating an example of a fourth device table;

FIG. 26 is an explanatory view illustrating an example of a fifth policy table;

DESCRIPTION OF EMBODIMENTS

Since the GW relays all communications to the devices, when the GW executes an advanced security function by a proxy operation for a large number of devices, the processing load of the GW increases to deteriorate the processing performance, which may result in deterioration of the quality of the IoT service. Therefore, there is a need for a method of reducing the processing load while securing a security against a device access.

Hereinafter, embodiments of, for example, a communication control method disclosed in the present disclosure will be described in detail with reference to the accompanying drawings. The disclosed techniques are not limited by the embodiments. Further, the disclosed embodiments may be appropriately combined with each other in a scope that does not cause any inconsistency.

First Embodiment

Figure 1:
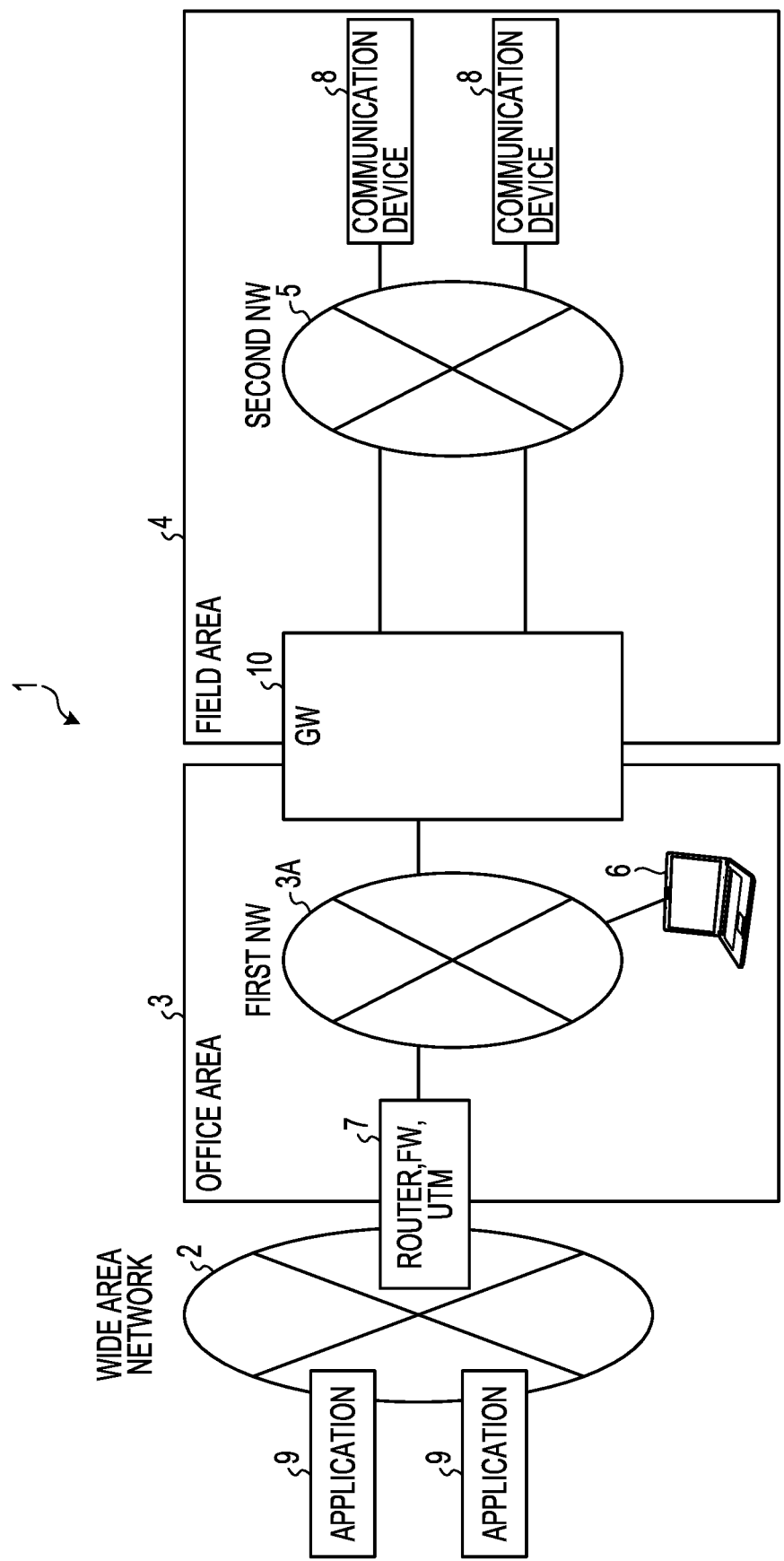
FIG. 1 is an explanatory view illustrating an example of a GW system according to an embodiment.

FIG. 1 is an explanatory view illustrating an example of a GW system 1 of the present embodiment. The GW system 1 illustrated in FIG. 1 includes the Internet or a wide area network 2, an office area 3, and a field area 4. The office area 3 has a first network (NW) 3A, and the field area 4 has a second network (NW) 5. The first NW 3A is, for example, a communication network such as a LAN (Local Area Network). The office area 3 is a communication area having plural information devices 6 such as PCs (Personal Computers) and a network (NW) device 7. The NW device 7 is a device that governs the security function between the wide area network 2 and the office area 3 and is for example, a device such as a fire wall (FW).

The field area 4 is a communication area having plural IoT devices (hereinafter simply referred to as devices) 8 connected through the second NW 5. The second NW 5 is, for example, a network such as Ethernet, WIFI® or BLUETOOTH®. Further, for example, a gateway (GW) 10 that relays a communication between an application 9 and a device 8 lies between the office area 3 and the field area 4. It is assumed that plural applications 9 are connected to the Internet or the wide area network 2 outside the office area 3. The office area 3 is a communication area with higher security management, whereas the field area 4 is a communication area with lower security management. Therefore, it is necessary for the device 8 in the field area 4 to protect an unauthorized access from, for example, the application 9.

Figure 2:
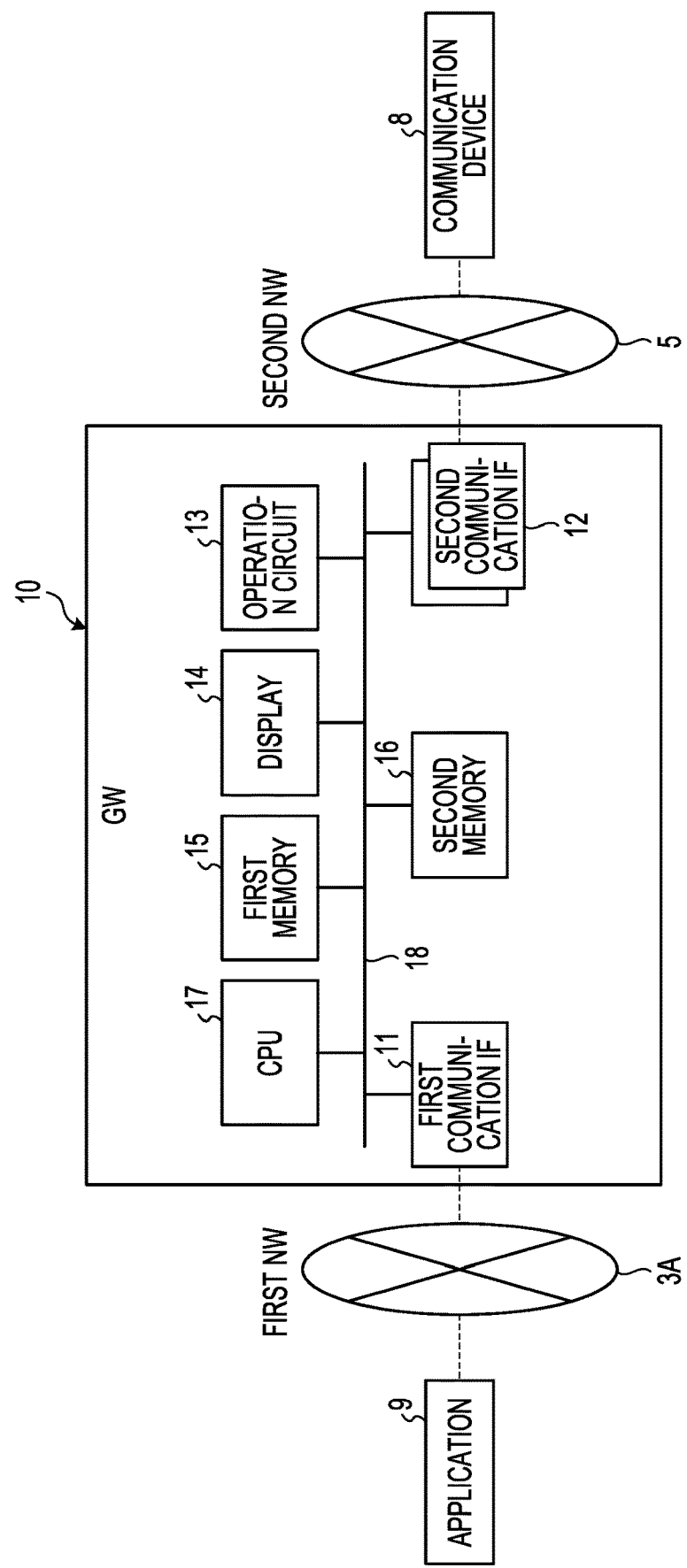
FIG. 2 is an explanatory view illustrating an example of a hardware configuration of GW.

FIG. 2 is an explanatory view illustrating an example of a hardware configuration of the GW 10. The GW 10 illustrated in FIG. 2 includes a first communication IF 11, a second communication IF 12, an operation circuit 13, a display 14, a first memory 15, a second memory 16, a CPU (Central Processing Unit) 17, and a bus 18. The first communication IF 11 is an interface that governs a communication with the information device 6 and the NW device 7 in the office area 3 or with the first NW 3A. The second communication IF 12 is an interface that governs a communication with the second NW 5. The operation circuit 13 is an input interface for inputting various commands. The display 14 is an output interface for displaying and outputting various kinds of information. The first memory 15 is a memory for storing various kinds of information. The second memory 16 is a memory for storing, for example, various programs. The CPU 17 controls the entire GW 10. The bus 18 is a transmission line for a bi-directional data communication between the first communication circuit 11, the second communication circuit 12, the operation circuit 13, the display 14, the first memory 15, the second memory 16, and the CPU 17.

Figure 3:
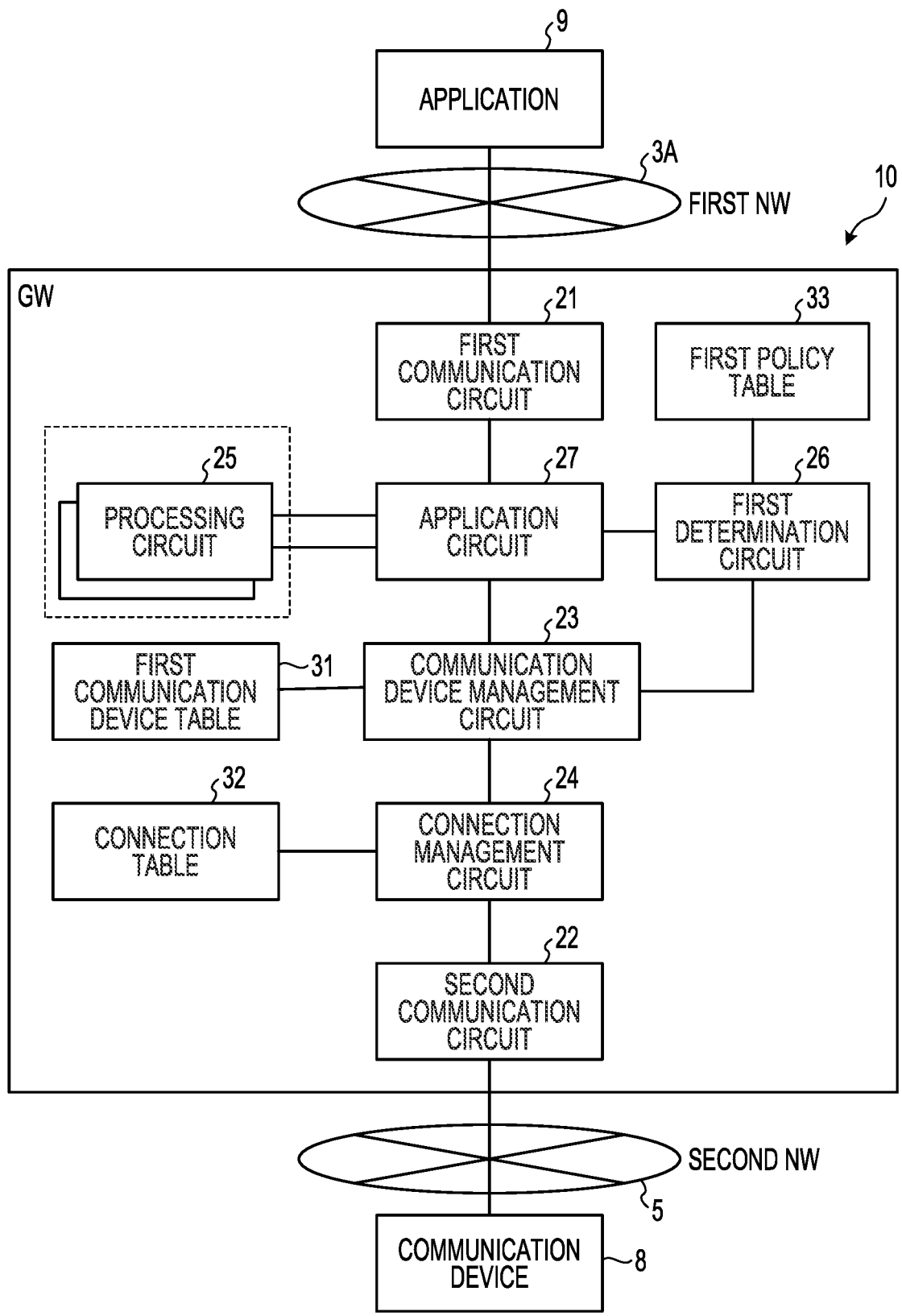
FIG. 3 is an explanatory view illustrating an example of a functional configuration of GW according to a first embodiment.

FIG. 3 is an explanatory view illustrating an example of a functional configuration of the GW 10 according to the first embodiment. The GW 10 illustrated in FIG. 3 reads a control program in the second memory 16 and deploys a communication control program on a work area of the first memory 15. Then, by deploying the communication control program, the GW 10 executes a first communication circuit 21, a second communication circuit 22, a device management circuit 23, a connection management circuit 24, a processing circuit 25, a first determination circuit 26, and an application circuit 27 as its function. The GW 10 stores a first device table 31, a connection table 32, and a first policy table 33.

The first communication circuit 21 is a communication function that communicates with the first communication IF 11. The second communication circuit 22 is a communication function that communicates with the second communication IF 12. The device management circuit 23 is a function that manages and controls the first device table 31. The connection management circuit 24 is a function that manages and controls the connection table 32. The processing circuit 25 is a processing circuit that executes a security function, for example, an authentication function, a verification function or a logging function, by a proxy operation for the device 8. When an access from the application 9 to the device 8 is detected, the first determination circuit 26 determines the security function to be applied to the processing circuit 25 according to the security-related characteristics of the device 8 to be accessed. The application circuit 27 applies the security function executed by a proxy operation for the device 8 to the processing circuit 25 according to the determination result of the first determination circuit 26.

FIG. 4 is an explanatory view illustrating an example of the first device table 31. The first device table 31 illustrated in FIG. 4 manages profiles of each device 8 such as, for example, an identifier 31A, identification information 31B, an authentication function 31C, a verification function 31D, a logging function 31E, and a communication scheme 31F, in association with each other. The identifier 31A is virtual identification information for identifying the device 8. The identification information 31B is product information of the device 8 indicating a product name and a vendor name of the device 8.

The authentication function 31C is the presence or absence of an authentication function implemented by the device 8, or the contents of the authentication function when there is the authentication function. The authentication function 31C includes a function such as setting ID/PW authentication or certificate authentication, as an authentication function for permitting an access to the device 8. The verification function 31D is the presence or absence of a verification function implemented by the device 8. The setting ID/PW authentication is a scheme of authenticating with an ID/PW set by an operation manager or the like of the device 8, not an initial value ID/PW. For example, the verification function 31D is a function of verifying whether or not a message is illegal. The logging function 31E is the presence or absence of a logging function implemented by the device 8. The logging function 31E is a function of recording a communication log with the device 8. The communication scheme 31F is a communication scheme such as a communication protocol or a data format used by the device 8. The authentication function 31C, the verification function 31D, and the logging function 31E are security-related characteristics of the device 8.

Figure 5:
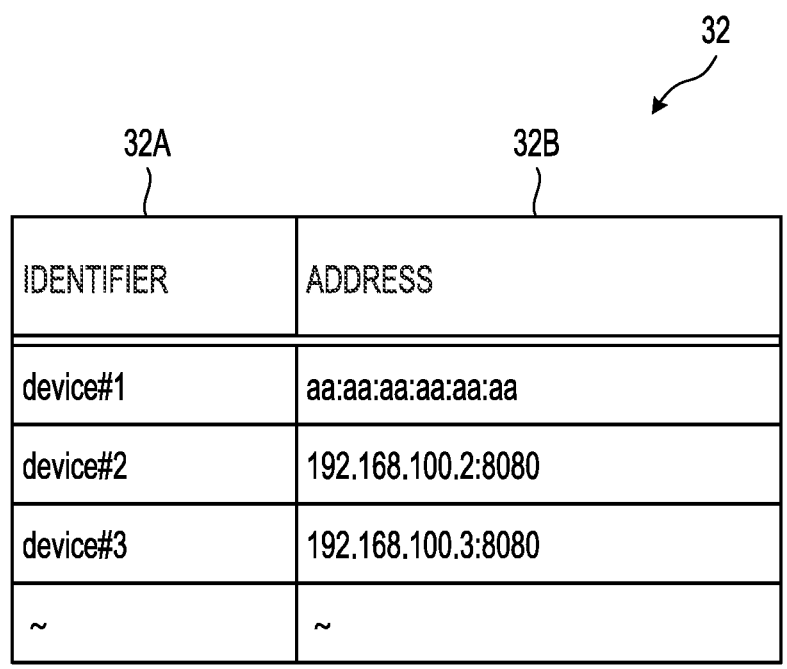
FIG. 5 is an explanatory view illustrating an example of a connection table.

FIG. 5 is an explanatory view illustrating an example of the connection table 32. The connection table 32 illustrated in FIG. 5 manages an identifier 32A and an address 32B in association for each device 8. The identifier 32A is virtual identification information for identifying the device 8. The address 32B is a communication address used to communicate with the device 8. The address 32B corresponds to an IP address and a port number when the device 8 is an IP (Internet Protocol) device, and corresponds to a BD address when the device 8 is a BLUETOOTH® device. In addition, the device 8 is associated with the identifier 32A and the address 32B.

Figure 6:
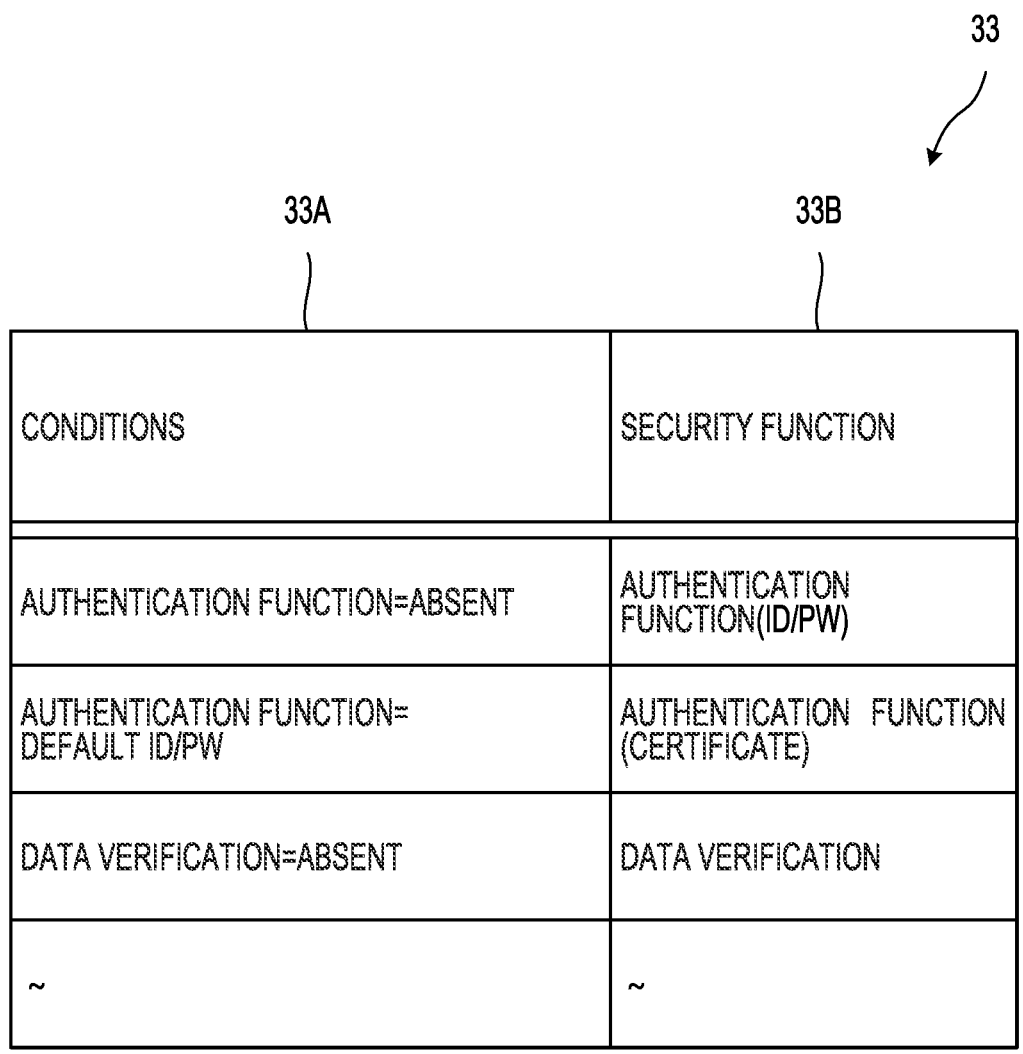
FIG. 6 is an explanatory view illustrating an example of a first policy table.

FIG. 6 is an explanatory view illustrating an example of the first policy table 33. The first policy table 33 illustrated in FIG. 6 manages a condition 33A and a security function 33B in association. The condition 33A is, for example, the mounting status of the device 8 such as the presence or absence of a verification function, or the presence or absence of a logging function. The security function 33B is a security function applied according to the condition 33A. The first determination circuit 26 refers to the first policy table 33 to determine the presence or absence of a security function or the contents of a delegable security function executed by a proxy operation for the device 8 according to the current mounting situation (condition) of the device 8.

The first determination circuit 26 refers to the first policy table 33, and determines that the setting ID/PW authentication is executed by a proxy operation for the device 8, when an access destination device 8 has no authentication function. In a case where the authentication function of the access destination device 8 is an initial value ID/PW authentication, the first determination circuit 26 determines that the certificate authentication is executed by a proxy operation for the device 8. When the authentication function of the access destination device 8 is the certificate authentication, the first determination circuit 26 determines that there is no proxy operation. That is, the first determination circuit 26 determines that the authentication function, that is, the certificate authentication is executed by the device 8 itself.

Further, when the access destination device 8 has no verification function, the first determination circuit 26 determines that the verification function is executed by a proxy operation for the device 8. When the access destination device 8 has the verification function, the first determination circuit 26 determines that there is no proxy operation. That is, the first determination circuit 26 determines that the verification function is executed by the device 8 itself. When the access destination device 8 has no logging function, the first determination circuit 26 determines that the logging function is executed by a proxy operation for the device 8. When the access destination device 8 has the logging function, the first determination circuit 26 determines that there is no proxy operation. That is, the first determination circuit 26 determines that the logging function is executed by the device 8 itself.

Figure 7:
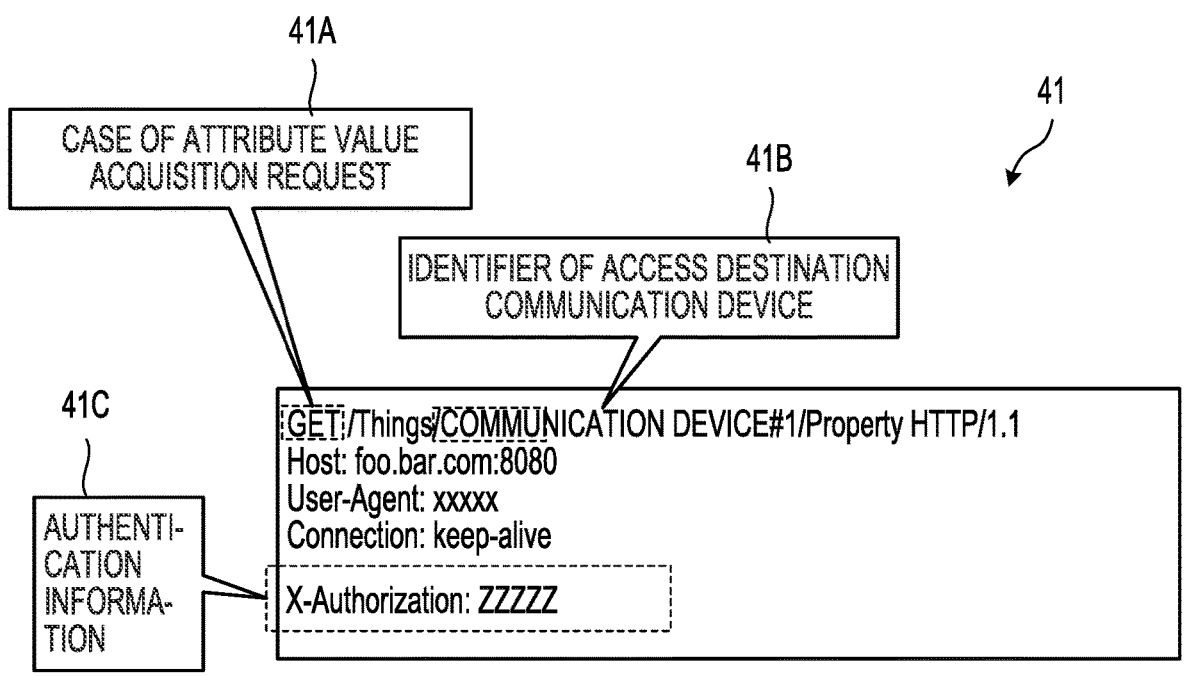
FIG. 7 is an explanatory view illustrating an example of a format of a request from an application to a device.

FIG. 7 is an explanatory view illustrating an example of a format of a request from the application 9 to the device 8. For example, the GW 10 receives an http request from the application 9 to the device 8. A request 41 illustrated in FIG. 7 has request identification information 41A for identifying the contents of the request 41, an identifier 41B for identifying the access destination device 8, and authentication information 41C such as an authentication token.

Figure 8:
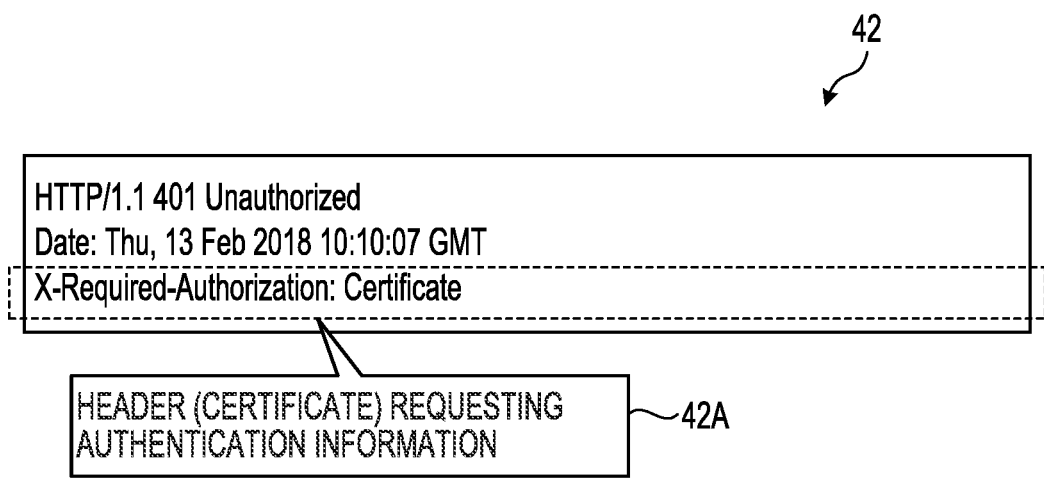
FIG. 8 is an explanatory view illustrating an example of a format of an authentication information re-request.

FIG. 8 is an explanatory view illustrating an example of a format of an authentication information re-request. The GW 10 notifies an authentication information re-request for requesting the authentication information from the device 8 to the application 9. An authentication information re-request 42 illustrated in FIG. 8 has, for example, a header 42A for requesting the authentication information.

Figure 9:
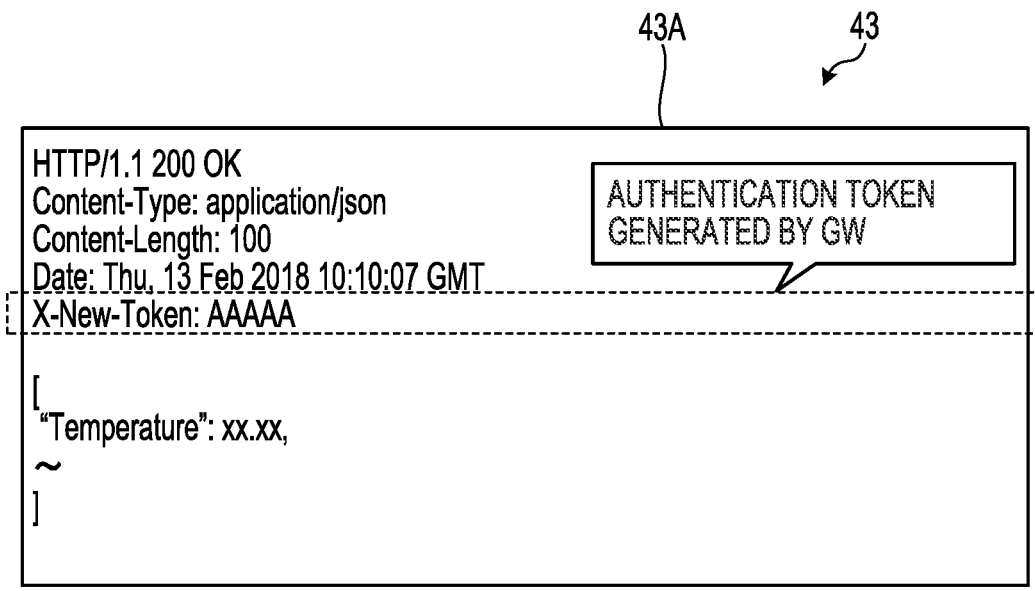
FIG. 9 is an explanatory view illustrating an example of a format of a request response.

FIG. 9 is an explanatory view illustrating an example of a format of a request response. The GW 10 notifies a request response from the device 8 to the application 9. A request response 43 illustrated in FIG. 9 has, for example, an authentication token 43A generated by the GW 10.

Figure 10A:
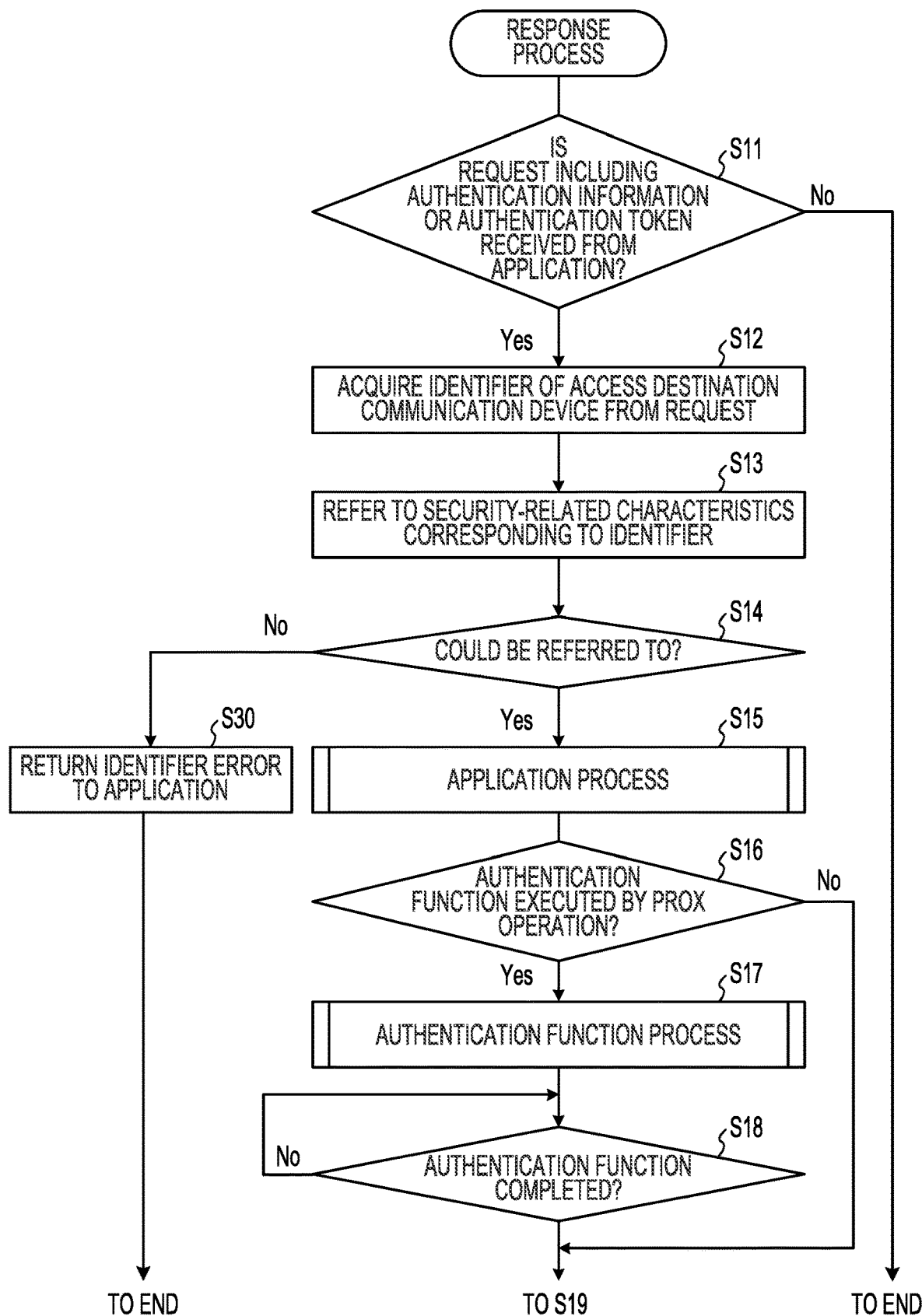
FIGS. 10A and 10B are flowcharts illustrating an example of a processing operation of GW related to a response process.
Figure 10B:
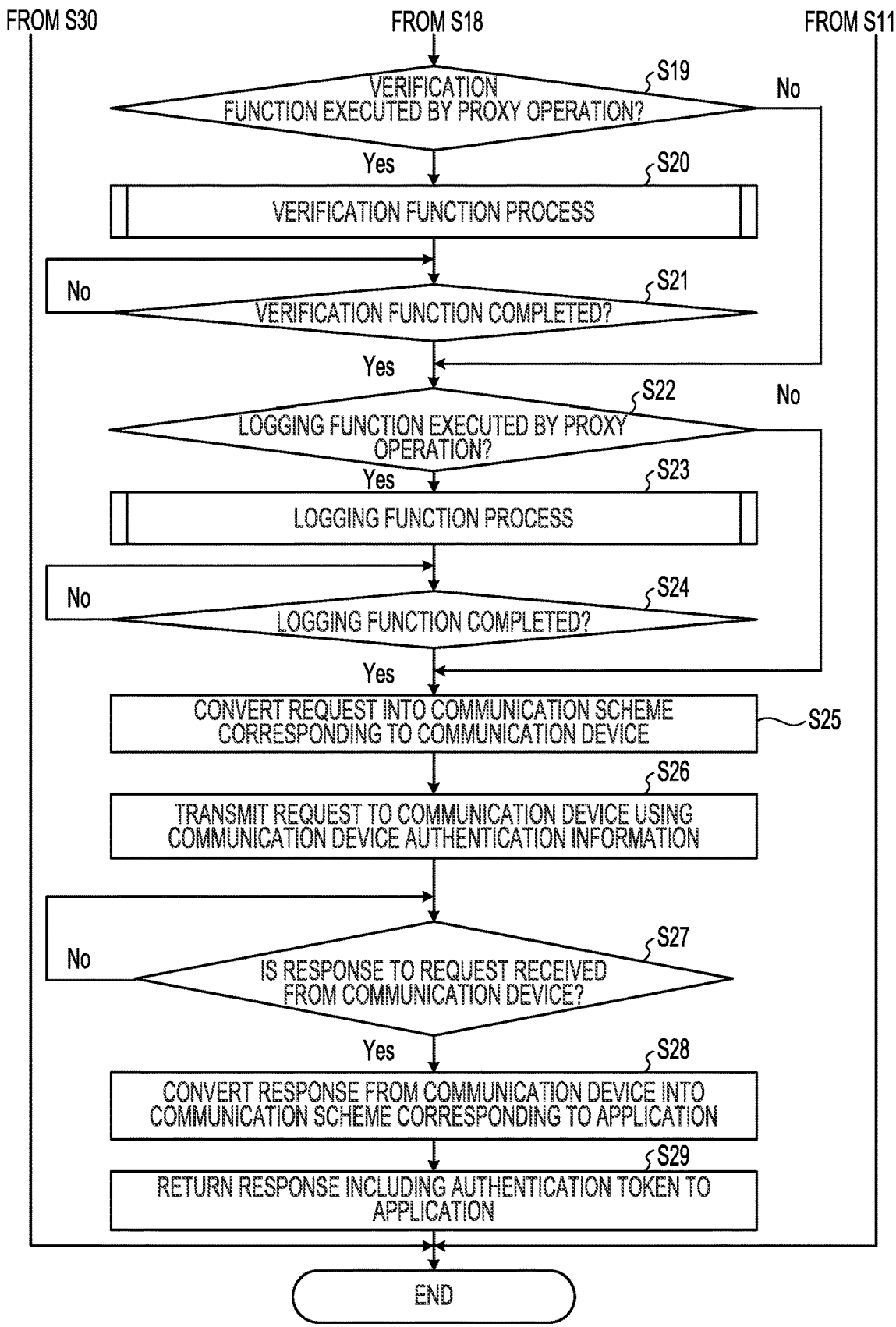

Next, the operation of the GW system 1 according to the first embodiment will be described. FIGS. 10A and 10B are flowcharts illustrating an example of the processing operation of the GW 10 related to a response process. The first communication circuit 21 in the GW 10 determines whether or not a request including authentication information or an authentication token (see FIG. 7) has been received from the application 9 (step S11). When it is determined that the request including the authentication information or the authentication token has been received ("Yes" in step S11), the first communication circuit 21 acquires an identifier of the access destination device 8 from the request (step S12). When it is determined that the request including the authentication information or the authentication token has not been received ("No" in step S11), the first communication circuit 21 ends the processing operation illustrated in FIGS. 10A and 10B.

The first determination circuit 26 in the GW 10 refers to the security-related characteristics corresponding to the identifier 31A of the access destination device 8 in the first device table 31 (step S13), and determines whether or not the security-related characteristics could be referred to (step S14). In addition, the security-related characteristics in the first device table 31 are, for example, an authentication function 31C, a verification function 31D, and a logging function 31E.

When the security-related characteristics could be referred-to, the first determination circuit 26 executes the application process (step S15). This application process is a first application process for determining whether or not the GW 10 executes the authentication function, the verification function, and the logging function of the access destination device 8 by a proxy operation and determining the contents of the security function in the case of execution by a proxy operation.

The application circuit 27 in the GW 10 determines whether or not to execute the authentication function by a proxy operation for the access destination device 8, based on the determination result of the authentication function of the application process (step S16). When it is determined that the authentication function is executed by a proxy operation ("Yes" in step S16), the application circuit 27 in the GW 10 applies the proxy authentication function to the processing circuit 25. When the device 8 has no authentication function, the application circuit 27 applies the setting ID/PW authentication to the processing circuit 25 on behalf of the device 8. When the authentication function of the device 8 is the authentication function of the initial value ID/PW, the application circuit 27 applies the certificate authentication to the processing circuit 25 on behalf of the device 8. When the authentication function of the device 8 is the certificate authentication, the application circuit 27 entrusts the execution of the authentication function (certificate authentication) to the device 8 itself, instead of a proxy execution by the GW 10. Then, the processing circuit 25 executes the authentication function applied on behalf of the device 8 (step S17).

The application circuit 27 determines whether or not the authentication function has been completed (step S18). When it is determined that the authentication function has been completed ("Yes" in step S18), the application circuit 27 determines whether to execute the verification function by a proxy operation for the access destination device 8, based on the determination result of the verification function of the application process (step S19). When it is determined that the verification function is to be executed by a proxy operation ("Yes" in step S19), the application circuit 27 applies the proxy verification function to the processing circuit 25. When the device 8 has no verification function, the application circuit 27 applies the verification function to the processing circuit 25 on behalf of the device 8. When the device 8 has the verification function, the application circuit 27 entrusts the execution of the verification function to the device 8 itself, instead of a proxy execution of the verification function by the GW 10. Then, the processing circuit 25 executes the verification function applied on behalf of the device 8 (step S20).

The application circuit 27 determines whether or not the verification function has been completed (step S21). When it is determined that the verification function has been completed (Yes in step S21), the application circuit 27 determines whether to execute the logging function by a proxy operation for the access destination device 8, based on the determination result of the logging function of the application process (step S22). When it is determined that the logging function is to be executed by a proxy operation ("Yes" in step S22), the application circuit 27 applies the proxy logging function to the processing circuit 25. When the device 8 has no logging function, the application circuit 27 applies the logging function to the processing circuit 25 on behalf of the device 8. When the device 8 has the logging function, the application circuit 27 entrusts the execution of the logging function to the device 8 itself, instead of a proxy execution of the logging function by the GW 10. Then, the processing circuit 25 executes the logging function applied on behalf of the device 8 (step S23).

The application circuit 27 determines whether or not the logging function has been completed (step S24). When it is determined that the logging function has been completed ("Yes" in step S24), the second communication circuit 22 converts the request from the application 9 to the device 8 into a communication scheme corresponding to the device 8 (step S25). The second communication circuit 22 acquires the communication scheme 31F corresponding to the identifier 31A of the device 8 from the first device table 31.

The second communication circuit 22 uses the device authentication information to transmit the request to the device 8 (step S26), and determines whether or not a response to the request has been received from the device 8 (step S27).

When it is determined that a response to the request has been received from the device 8 ("Yes" in step S27), the second communication circuit 22 converts the response from the device 8 into a communication scheme corresponding to the application 9 (step S28). Further, the second communication circuit 22 returns a request response including an authentication token to the application 9 (step S29), and ends the processing operation illustrated in FIG. 10B. In addition, the request response is the message illustrated in FIG. 9.

When it is determined that the authentication function is not executed by a proxy operation ("No" in step S16), the application circuit 27 proceeds to step S19 to determine whether to execute the verification function by a proxy operation. In addition, when the authentication function is not executed by a proxy operation, the application circuit 27 entrusts the execution of the authentication function to the device 8. When it is determined that the authentication function has not been completed ("No" in step S18), the application circuit 27 proceeds to step S18 to determine whether or not the authentication function has been completed. When it is determined that the verification function is not executed by a proxy operation ("No" in step S19), the application circuit 27 proceeds to step S22 to determine whether to execute the logging function by a proxy operation. In addition, when the verification function is not executed by a proxy operation, the application circuit 27 entrusts the execution of the verification function to the device 8. When it is determined that the verification function has not been completed ("No" in step S21), the application circuit 27 proceeds to step S21 to determine whether or not the verification function has been completed.

When it is determined that the logging function is not executed by a proxy operation ("No" in step S22), the application circuit 27 proceeds to step S25 to convert the request to the communication scheme corresponding to the device 8. In addition, when the logging function is not executed by a proxy operation, the application circuit 27 entrusts the execution of the logging function to the device 8. When it is determined that the logging function has not been completed ("No" in step S24), the application circuit 27 proceeds to step S24 to determine whether or not the logging function has been completed. When it is determined that a response to the request has not been received from the device 8 ("No" in step S27), the second communication circuit 22 proceeds to step S27 to determine whether or not a response to the request has been received.

When it is determined that the security-related characteristics corresponding to the identifier 31A of the access destination device 8 could not be referred to ("No" in step S14), the first communication circuit 21 returns an identifier error to the application 9 (step S30) and ends the processing operation.

The GW 10 refers to the security-related characteristic corresponding to the identifier 31A of the access destination device 8, and applies the presence or absence of the security function or the contents of the security function executed by a proxy operation to the processing circuit 25 according to the security-related characteristics. As a result, the security function of the access destination device 8 may be strengthened.

Figure 11:
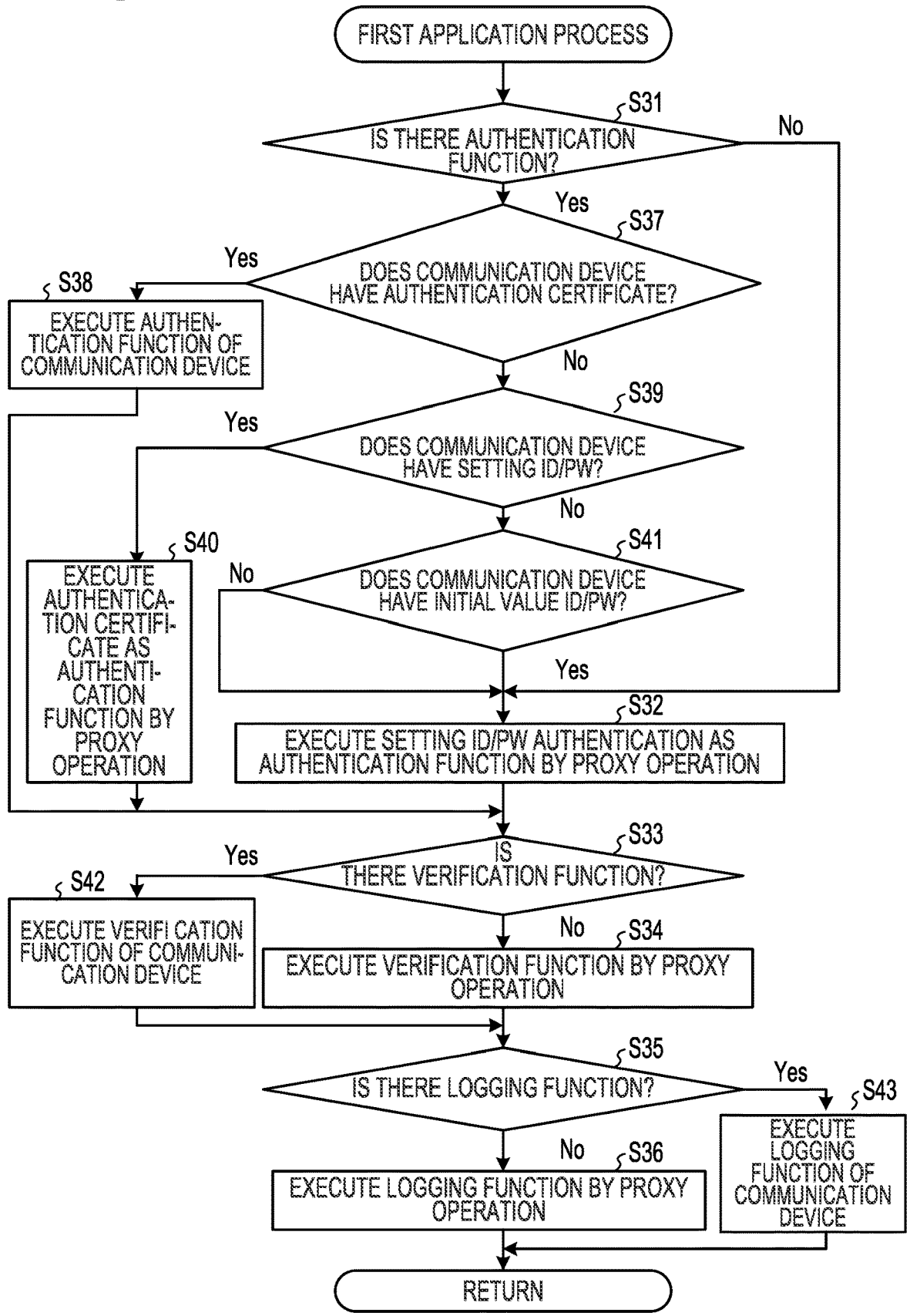
FIG. 11 is a flowchart illustrating an example of a processing operation of GW related to a first application process.

FIG. 11 is a flowchart illustrating an example of the processing operation of the GW 10 related to the first application process. In FIG. 11, the first determination circuit 26 in the GW 10 refers to the authentication function 31C in the first device table 31 to determine whether or not the access destination device 8 has an authentication function (step S31). When it is determined that the access destination device 8 has no authentication function ("No" in step S31), the first determination circuit 26 determines that the setting ID/PW authentication as the authentication function is executed by a proxy operation for the device 8 (step S32).

After determining that the authentication function is executed by a proxy operation, the first determination circuit 26 refers to the verification function 31D in the first device table 31 to determine whether or not the access destination device 8 has a verification function (step S33). When it is determined that the access destination device 8 has no verification function ("No" in step S33), the first determination circuit 26 determines that the verification function is executed by a proxy operation for the device 8 (step S34).

After determining that the verification function is executed by a proxy operation, the first determination circuit 26 refers to the logging function 31E in the first device table 31 to determine whether or not the access destination device 8 has a logging function (step S35). When it is determined that the access destination device 8 has no logging function ("No" in step S35), the first determination circuit 26 determines that the logging function is executed by a proxy operation for the device (step S36), and ends the processing operation illustrated in FIG. 11.

When it is determined that the access destination device 8 has the authentication function ("Yes" in step S31), the first determination circuit 26 refers to the authentication function 31C in the first device table 31 to determine whether or not the authentication function of the device 8 is a certificate authentication (step S37). When it is determined that the authentication function of the device 8 is the certificate authentication ("Yes" in step S37), the first determination circuit 26 determines that the authentication function is not executed by a proxy operation, that is, the authentication function (certificate authentication) is executed by the device 8 itself (step S38). Then, the first determination circuit 26 proceeds to step S33 to determine whether or not the access destination device 8 has a verification function.

When it is determined that the authentication function of the device 8 is not the certificate authentication ("No" in step S37), the first determination circuit 26 refers to the authentication function 31C in the first device table 31 to determine whether or not the authentication function of the device 8 is a setting ID/PW authentication (step S39). When it is determined that the authentication function of the device 8 is the setting ID/PW authentication ("Yes" in step S39), the first determination circuit 26 determines that the certificate authentication as the authentication function is executed by a proxy operation for the device 8 (step S40). Then, the first determination circuit 26 proceeds to step S33 to determine whether or not the access destination device 8 has a verification function.

When it is determined that the authentication function of the device 8 is not the setting ID/PW authentication ("No" in step S39), the first determination circuit 26 refers to the authentication function 31C in the first device table 31 to determine whether or not the authentication function of the device 8 is an initial value ID/PW authentication (step S41). When it is determined that the authentication function of the device 8 is the initial value ID/PW authentication ("Yes" in step S41), the first determination circuit 26 proceeds to step S32 to determine that the setting ID/PW authentication as the authentication function is executed by a proxy operation.

When it is determined that the access destination device 8 has the verification function ("Yes" in step S33), the first determination circuit 26 determines that the verification function is not executed by a proxy operation, that is, the verification function is executed by the device 8 itself (step S42). Then, the first determination circuit 26 proceeds to step S35 to determine whether or not the access destination device 8 has a logging function. When it is determined that the access destination device 8 has the logging function ("Yes" in step S35), the first determination circuit 26 determines that the logging function is not executed by a proxy operation, that is, the logging function is executed by the device 8 itself (step S43), and ends the processing operation illustrated in FIG. 1. When it is determined that the authentication function of the device 8 is not the initial value ID/PW authentication ("No" in step S41), the first determination circuit 26 proceeds to step S32 to determine that the setting ID/PW authentication as the authentication function is executed by a proxy operation.

When the access destination device 8 has no authentication function, the GW 10 determines that the setting ID/PW authentication is executed by a proxy operation for the device 8. As a result, even when the device 8 has no authentication function, the GW 10 may strengthen the authentication function of the device 8. Thus, it is possible to improve the quality of the IoT service.

When the authentication function of the access destination device 8 is the certificate authentication, the GW 10 determines that the certificate authentication is executed by the device 8 itself. As a result, since the GW 10 does not uniformly execute the authentication function by a proxy operation but entrusts the execution of the certificate authentication to the device 8 itself, it is possible to reduce a processing load on the GW 10.

When the authentication function of the access destination device 8 is the setting ID/PW authentication, the GW 10 determines that the certificate authentication is executed by a proxy operation for the device 8. As a result, even when the device 8 has the setting ID/PW authentication function, the GW 10 may strengthen the authentication function of the device 8.

When the authentication function of the access destination device 8 is the initial value ID/PW authentication, the GW 10 determines that the setting ID/PW authentication is executed by a proxy operation for the device 8. As a result, even when the device 8 has the initial value ID/PW authentication function, the GW 10 may strengthen the authentication function of the device 8.

When the access destination device 8 has no verification function, the GW 10 determines that the verification function is executed by a proxy operation for the device 8. As a result, even when the device 8 has no verification function, the GW 10 may strengthen the verification function of the device 8.

When the access destination device 8 has the verification function, the GW 10 determines that the verification function is executed by the device 8 itself. As a result, since the GW 10 does not uniformly execute the verification function by a proxy operation but entrusts the verification function to the device 8 itself when the device 8 has the verification function, it is possible to reduce the processing load on the GW 10.

When the access destination device 8 has no logging function, the GW 10 determines that the logging function is executed by a proxy operation for the device 8. As a result, even when the device 8 has no logging function, the GW 10 may strengthen the logging function of the device 8.

When the access destination device 8 has the logging function, the GW 10 determines that the logging function is executed by the device 8 itself. As a result, since the GW 10 does not uniformly execute the logging function by a proxy operation but entrusts the logging function to the device 8 itself when the device 8 has the logging function, it is possible to reduce the processing load on the GW 10.

Figure 12:
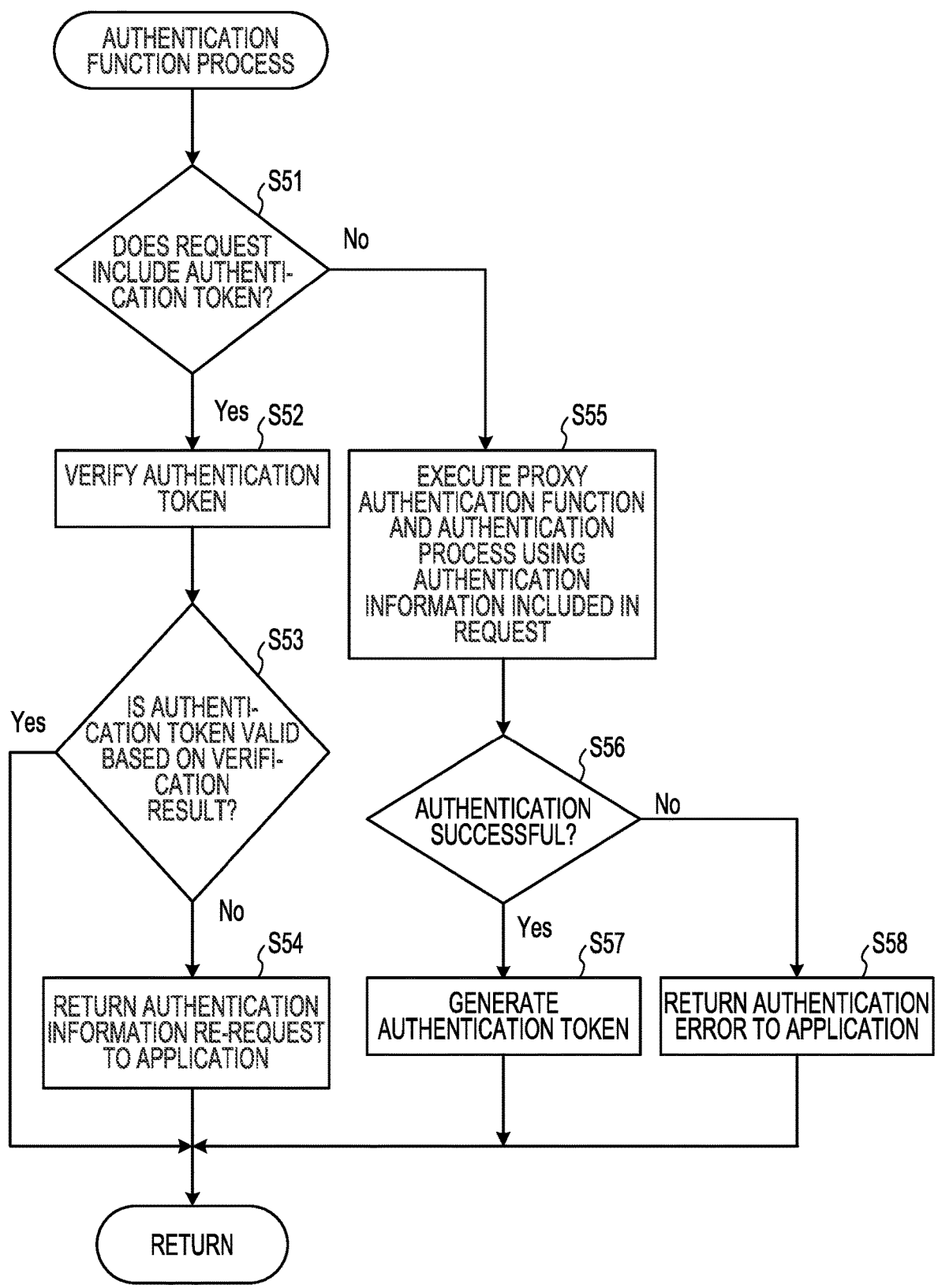
FIG. 12 is a flowchart illustrating an example of a processing operation of GW related to an authentication process.

FIG. 12 is a flowchart illustrating an example of the processing operation of the GW 10 related to the authentication process. In a case where the authentication function is executed by a proxy operation for the device 8, the processing circuit 25 in the GW 10 determines whether or not the request from the application 9 to the access destination device 8 includes an authentication token (step S51). The authentication token is data with an expiration date, which indicates the completion of authentication and can be changed and verified by only the GW 10. When it is determined that the request includes the authentication token ("Yes" in step S51), the processing circuit 25 verifies the authentication token (step S52) and determines whether or not the authentication token is valid based on the verification result (step S53).

When the expiration date and an issuer are checked and when it is determined that the authentication token is valid, that is, the authentication token is issued by the GW 10 within the expiration date ("Yes" in step S53), the processing circuit 25 checks a transmission source application 9 and ends the processing operation illustrated in FIG. 12. When the expiration date and the issuer are checked and it is determined that the authentication token is not valid ("No" in step S53), the processing circuit 25 returns an authentication information re-request to the application 9 (step S54) and ends the processing operation illustrated in FIG. 12. The authentication information re-request is a message requesting the application 9 for re-authentication as illustrated in FIG. 8.

When it is determined that the request does not include the authentication token ("No" in step S51), the processing circuit 25 executes a proxy authentication function and an authentication function using the authentication information included in the request (step S55). After executing the authentication function, the processing circuit 25 determines whether or not the authentication has been successful (step S56). The successful authentication includes the successful verification of the authentication token and the successful authentication by the authentication information. When it is determined that the authentication has been successful ("Yes" in step S56), the processing circuit 25 generates an authentication token (step S57), appends the authentication token to a response header for the application 9, returns the response header to the application 9, and then ends the processing illustrated in FIG. 12. When it is determined that the authentication has not been successful ("No" in step S56), the processing circuit 25 returns an authentication error to the application 9 (step S58) and ends the processing operation illustrated in FIG. 12.

The first device table 31 manages the identification information 31B, the authentication function 31C, the verification function 31D, the logging function 31E, and the communication scheme 31F collectively for each identifier 31A of the device 8. However, for example, these items may be managed individually or in plural units or may be appropriately changed for each identifier 31A.

The first device table 31 and the connection table 32 are individually managed. However, the identification information 31B, the authentication function 31C, the verification function 31D, the logging function 31E, the communication scheme 31F, and the address 32B may be collectively managed or may be appropriately changed for each identifier 31A (32A).

The contents of the first device table 31 and the connection table 32 are preset, for example, before starting the operation of the GW system 1. However, the identifier, the identification information, the authentication function, the verification function, the logging function, the communication scheme, and the address of the device 8 may be automatically added or may be appropriately changed at the point of time when the GW 10 is connected to the device 8 and becomes usable. A device 8 or a BLE device 8 corresponding to UPnP may acquire information for identifying the device 8 or may automatically update the contents of the first device table 31 by using the information.

Second Embodiment

Figure 13:
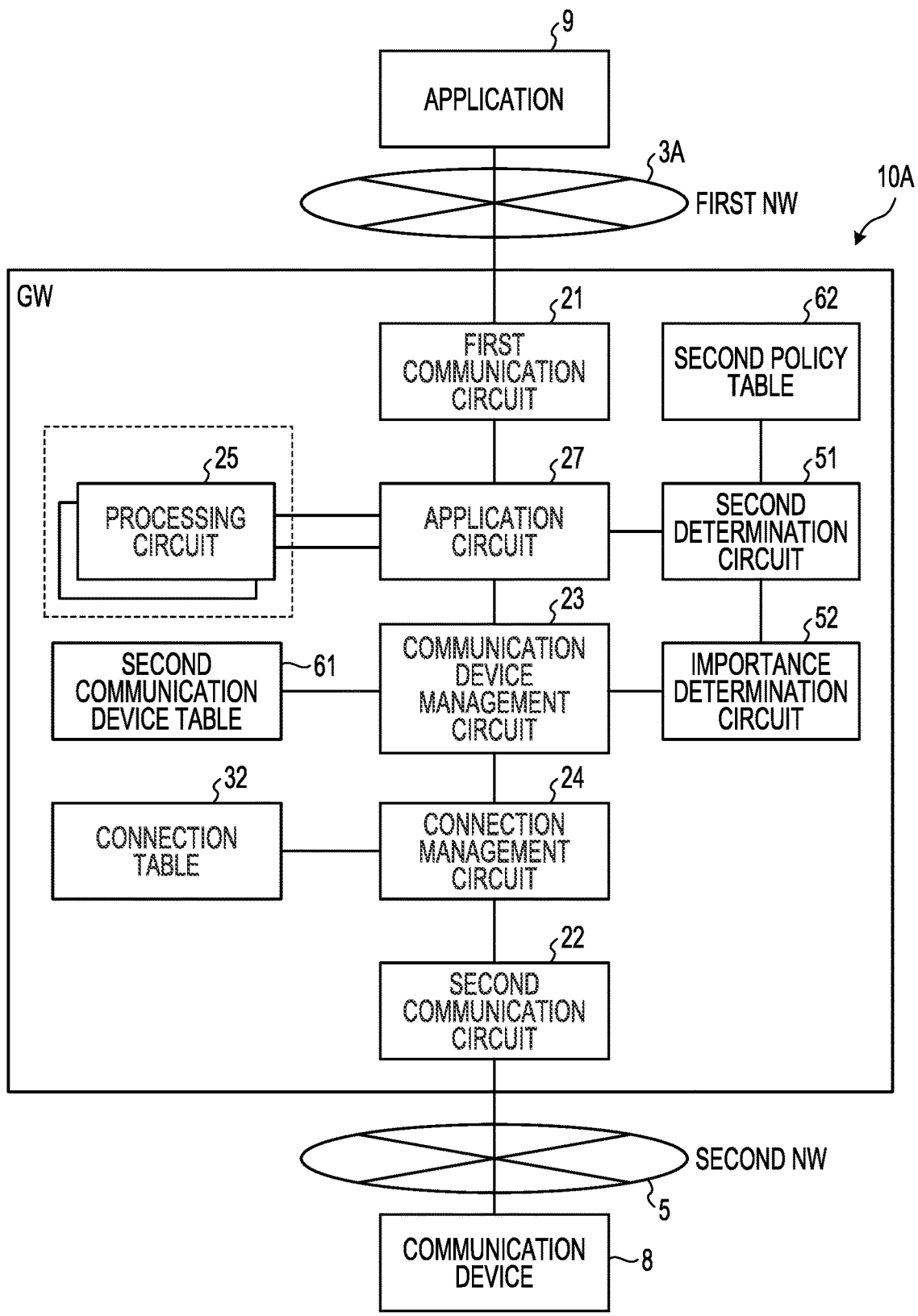
FIG. 13 is an explanatory view illustrating an example of a functional configuration of GW according to a second embodiment.

FIG. 13 is an explanatory view illustrating an example of a functional configuration of a GW 10A according to a second embodiment. The same components as those of the GW system 1 of the first embodiment will be denoted by the same reference numerals, and overlapping explanation of the configuration and operation thereof will be omitted. The GW 10A illustrated in FIG. 13 is different from the GW 10 of the first embodiment in that the former has a second device table 61 on behalf of the first device table 31 and a second policy table 62 on behalf of the first policy table 33. Further, the GW 10A of FIG. 13 is different from the GW 10 of the first embodiment in that the GW 10A has a second determination circuit 51 and an importance determination circuit 52 on behalf of the first determination circuit 26.

Figure 14:
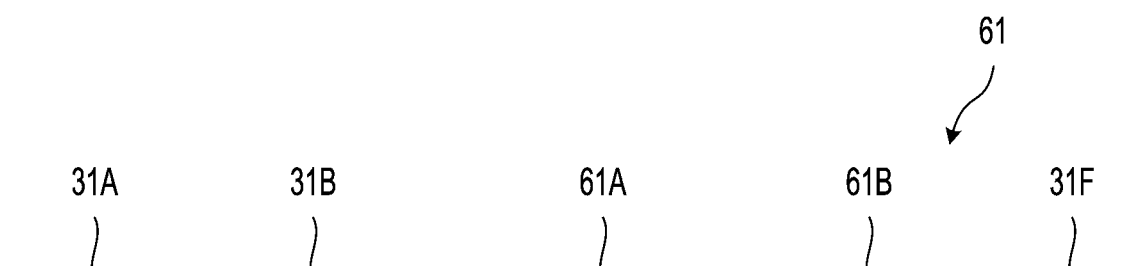
FIG. 14 is an explanatory view illustrating an example of a second device table.

FIG. 14 is an explanatory view illustrating an example of the second device table 61. The second device table 61 illustrated in FIG. 14 manages a device type 61A and a device usage 61B in association, in addition to the identifier 31A, the identification information 31B, and the communication scheme 31F. The device type 61A is information on a device type such as an actuator that drives and controls hardware, or a sensor that acquires a sensor value. The device usage 61B is information on the usage of the device 8 such as a control system or a display system. The device type 61A and the device usage 61B are security-related characteristics. Since the actuator has a larger physical influence than the sensor, the actuator has a higher importance. In addition, since the same sensor also has a display system that collects data for visualizing the state and a control system that uses the collected data to control the actuator and the control system has a larger physical influence than the display system, the control system has a higher importance. For example, when attacked by malware, the importance of a device 8 having a larger influence on hardware is set to be higher. That is, it is necessary to strongly defend a device 8 with a higher importance with strict authentication and advanced verification and to loosely defend a device 8 with a lower importance, thereby reducing the processing load on the GW 10A.

Figure 15:
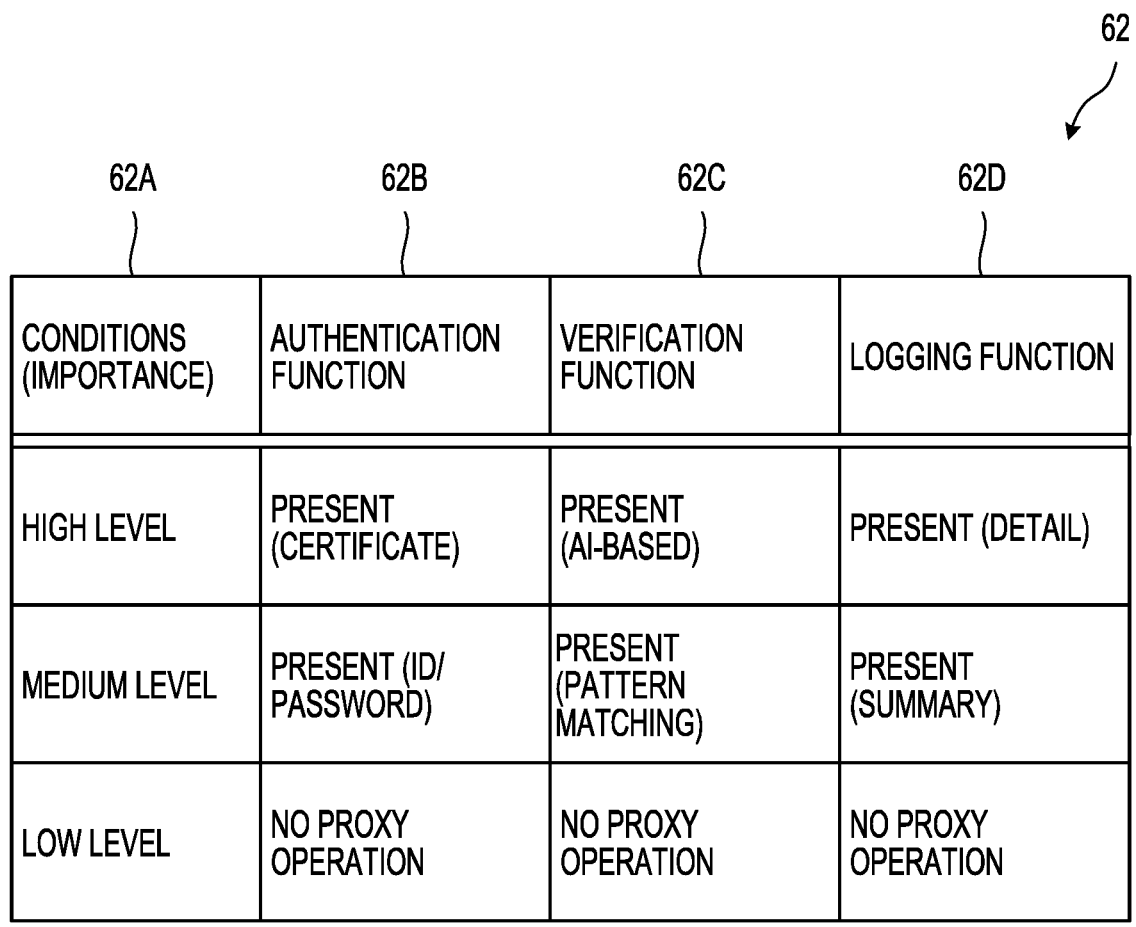
FIG. 15 is an explanatory view illustrating an example of a second policy table.

FIG. 15 is an explanatory view illustrating an example of the second policy table 62. The second policy table 62 illustrated in FIG. 15 manages an authentication function 62B, a verification function 62C, and a logging function 62D according to an importance 62A. The importance 62A is the importance of the device 8 and includes, for example, three levels: a high level, a medium level, and a low level.

When an access to the device 8 is detected, the importance determination circuit 52 refers to the device type 61A and the device usage 61B in the second device table 32 to determine the importance of the device 8 according to the device type 61A and the device usage 61B of the access destination device 8. When the device type of the access destination device 8 is an actuator, the importance determination circuit 52 determines that the importance of the device 8 is a high level. When the device type of the access destination device 8 is not an actuator and the device usage is a control system, the importance determination circuit 52 determines that the importance of the device 8 is a medium level. When the device type of the access destination device 8 is not an actuator and the device usage is not a control system, the importance determination circuit 52 determines that the importance of the device 8 is a low level.

According to the importance of the device 8, the second determination circuit 51 refers to the second policy table 62 to determine whether to execute the authentication function, the verification function, and the logging function by a proxy operation or determine the contents of the functions executed by a proxy operation. In the case where the importance is the high level, the second determination circuit 51 determines that the certificate authentication, the AI-based verification function, and the detailed logging function are executed by a proxy operation for the device 8. In the case where the importance is the medium level, the second determination circuit 51 determines that the setting ID/PW authentication, the matching pattern verification function, and the summary logging function are executed by a proxy operation for the device 8. In the case where the importance is the low level, the second determination circuit 51 determines that the authentication function, the verification function, and the logging function are not executed by a proxy operation. That is, the second determination circuit 51 entrusts the authentication function, the verification function and the logging function to the device 8 itself. When the authentication function is not executed by a proxy operation, the application circuit 27 entrusts the authentication function to the device 8 itself. When the verification function is not executed by a proxy operation, the application circuit 27 entrusts the verification function to the device 8 itself. When the logging function is not executed by a proxy operation, the application circuit 27 entrusts the logging function to the device 8 itself.

Figure 16:
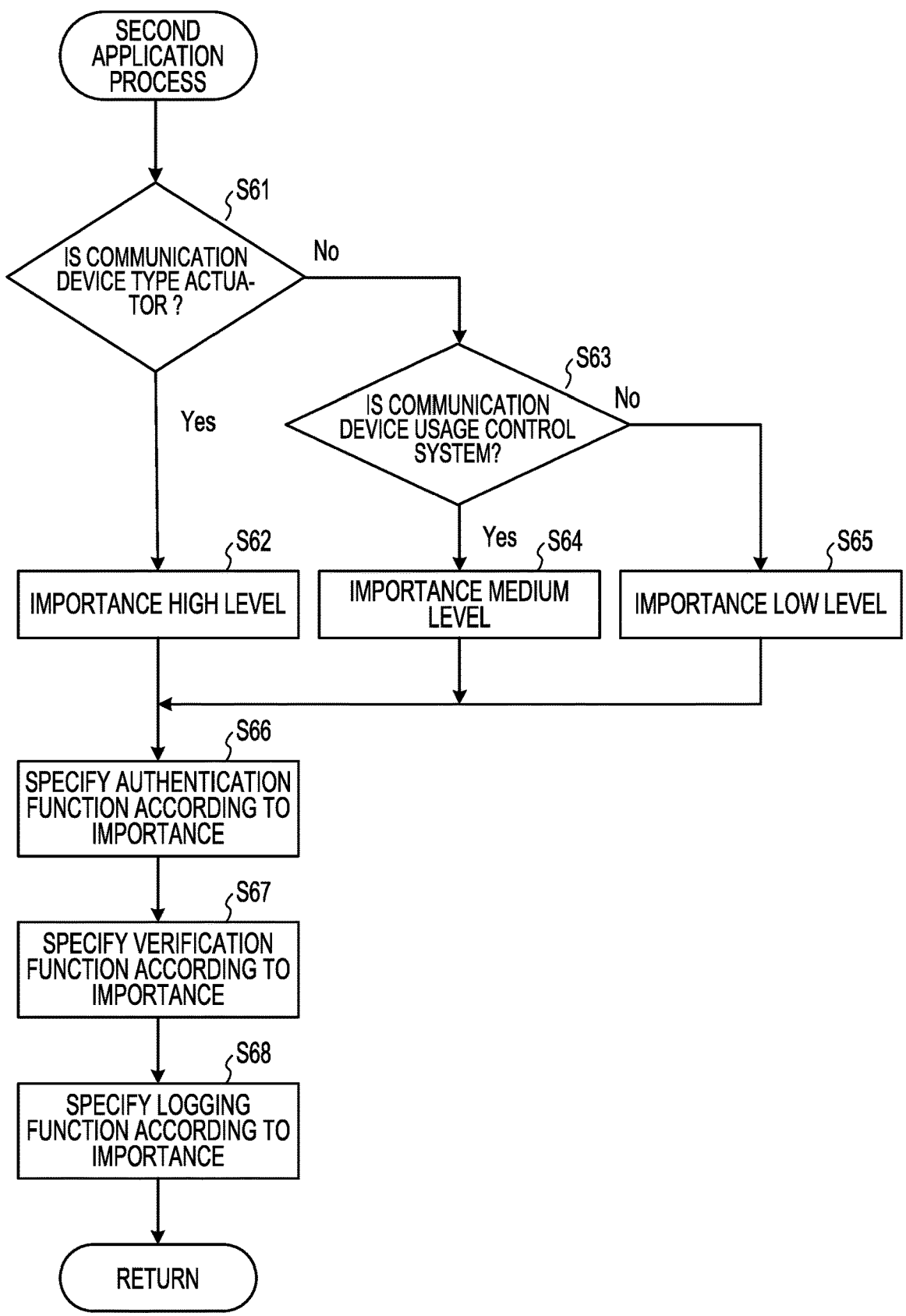
FIG. 16 is a flowchart illustrating an example of a processing operation of GW related to a second application process.

FIG. 16 is a flowchart illustrating an example of the processing operation of the GW 10 related to the second application process. The second application process is a process executed in the application process illustrated in FIG. 10. In FIG. 16, the importance determination circuit 52 in the GW 10 refers to the device type 61A corresponding to the identifier 31A of the access destination device 8 in the second device table 61, to determine whether or not the device type 61A is an actuator (step S61). When it is determined that the device type 61A is the actuator ("Yes" in step S61), the importance determination circuit 52 determines that the importance is the high level (step S62).

When it is determined that the device type 61A is not the actuator ("No" in step S61), the importance determination circuit 52 determines whether or not the device usage 61B corresponding to the identifier 31A of the access destination device 8 is a control system (step S63). When it is determined that the device usage 61B is the control system ("Yes" in step S63), the importance determination circuit 52 determines that the importance is the medium level (step S64). When it is determined that the device usage is not the control system ("No" in step S63), the importance determination circuit 52 determines that the importance is the low level (step S65).

After determining the importance in step S62, step S64 or step S65, the second determination circuit 51 specifies the authentication function according to the importance of the access destination device 8 (step S66). When the importance is the high level, the second determination circuit 51 determines that the certificate authentication is executed by a proxy operation for the device 8. When the importance is the medium level, the second determination circuit 51 determines that the setting ID/PW authentication is executed by a proxy operation for the device 8. When the importance is the low level, the second determination circuit 51 determines that the authentication function is not executed by a proxy operation. Then, the application circuit 27 applies the authentication function to the processing circuit 25 according to the importance. When the authentication function is not executed by a proxy operation, the application circuit 27 entrusts the authentication function to the device 8 itself.

After specifying the authentication function according to the importance of the access destination device 8, the second determination circuit 51 specifies the verification function according to the importance of the access destination device 8 (step S67). When the importance is the high level, the second determination circuit 51 determines that the AI-based verification function is executed by a proxy operation for the device 8. When the importance is the medium level, the second determination circuit 51 determines that the matching pattern verification function is executed by a proxy operation for the device 8. When the importance is the low level, the second determination circuit 51 determines that the verification function is not executed by a proxy operation. Then, the application circuit 27 applies the verification function to the processing circuit 25 according to the importance. When the verification function is not executed by a proxy operation, the application circuit 27 entrusts the verification function to the device 8 itself.

After specifying the verification function according to the importance of the access destination device 8, the second determination circuit 51 specifies the logging function according to the importance of the access destination device 8 (step S68), and ends the processing operation illustrated in FIG. 16. When the importance is the high level, the second determination circuit 51 determines that the detailed logging function is executed by a proxy operation for the device 8. When the importance is the medium level, the second determination circuit 51 determines that the summary logging function is executed by a proxy operation for the device 8. When the importance is the low level, the second determination circuit 51 determines that the logging function is not executed by a proxy operation. Then, the application circuit 27 applies the logging function to the processing circuit 25 according to the importance. When the logging function is not executed by a proxy operation, the application circuit 27 entrusts the verification function to the device 8 itself.

When the device type of the access destination device 8 is the actuator, the GW 10A determines that the importance is the high level. When the importance is the high level, the GW 10A determines that the authentication function, the verification function, and the logging function corresponding to the high level are executed by a proxy operation. As a result, when the importance of the device 8 is the high level, the authentication function, the verification function, and the logging function of the device 8 may be strengthened.

When the device type of the access destination device 8 is not the actuator and the device usage is the control system, the GW 10A determines that the importance is the medium level. When the importance is the medium level, the GW 10A determines that the authentication function, the verification function, and the logging function corresponding to the medium level are executed by a proxy operation. As a result, when the importance of the device 8 is the medium level, the authentication function, the verification function, and the logging function of the device 8 may be strengthened.

When the device type of the access destination device 8 is not the actuator and the device usage is not the control system, the GW 10A determines that the importance is the low level. When the importance is the low level, the GW 10A determines that the authentication function, the verification function, and the logging function corresponding to the low level are not executed by a proxy operation. As a result, when the importance of the device 8 is the low level, since the GW 10A does not uniformly execute the authentication function, the verification function, and the logging function by a proxy operation but entrusts these functions to the device 8 itself, it is possible to reduce the processing load on the GW 10A.

Although the control system and the display system are exemplified as the device usage for the sake of convenience of explanation, the device usage may be determined and may be appropriately changed according to a combination of device identifiers and application identifiers depending on the use of the application.

For example, information as to how much the device 8 is threatened may be also used as the security-related characteristics. For example, when a virus intrudes into the office area 3, since there is a high possibility that the device 8 is also attacked, a stronger defense is required. In addition, when a report on viruses found by a security product vendor is released or when, for example, the JPCERT Coordination Center or the Information-technology Promotion Agency (IPA) discloses the vulnerability of software, there is a high possibility that it is exploited before countermeasures are implemented. A third embodiment for coping with such a situation will be described below.

Third Embodiment

Figure 17:
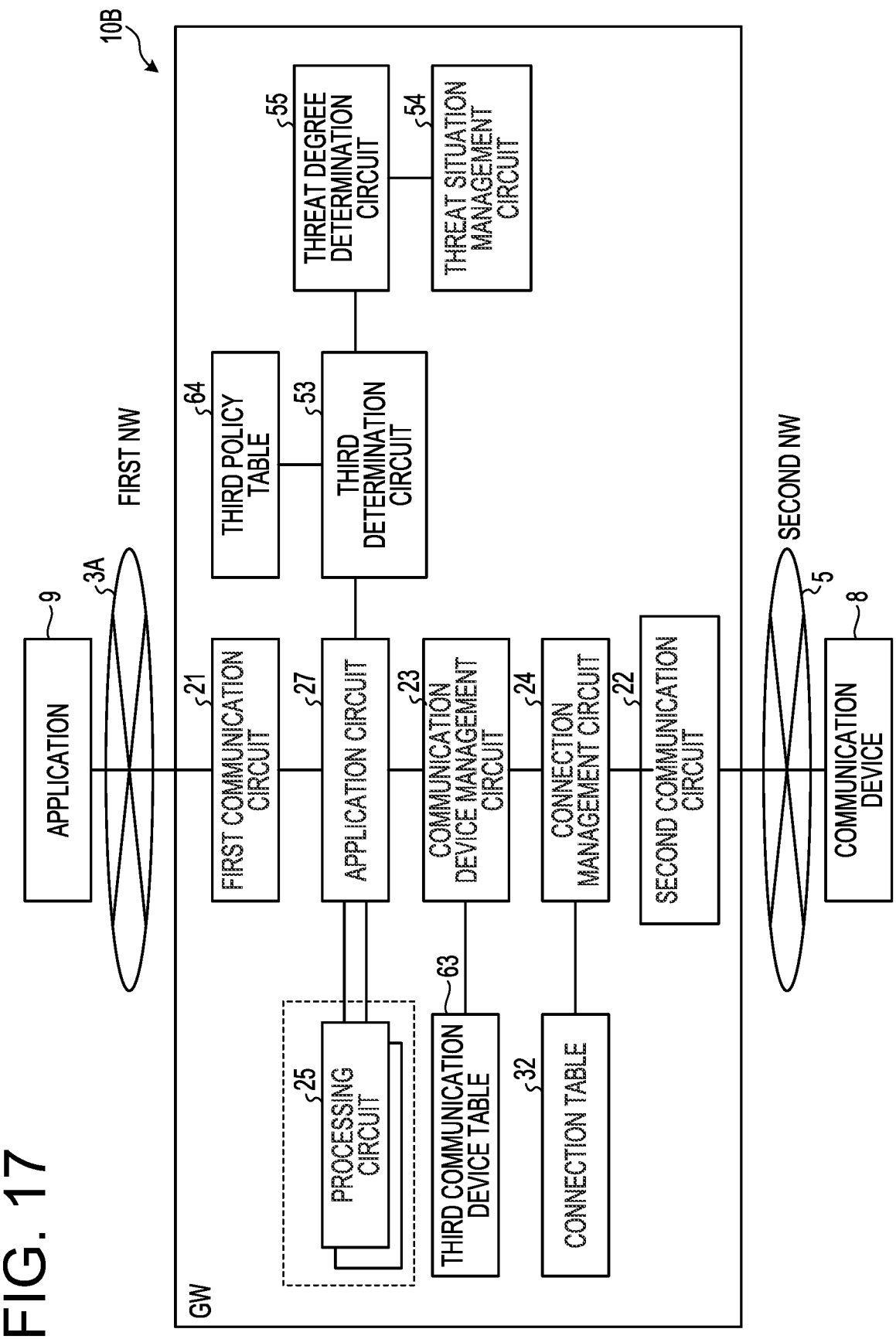
FIG. 17 is an explanatory view illustrating an example of a functional configuration of GW according to a third embodiment.

FIG. 17 is an explanatory view illustrating an example of a functional configuration of a GW 10B according to a third embodiment. The same components as those of the GW 10 of the first embodiment will be denoted by the same reference numerals, and overlapping explanation of the configuration and operation thereof will be omitted. The GW 10B illustrated in FIG. 17 is different from the GW 10 of the first embodiment in that the former has a third device table 63 on behalf of the first device table 31 and a third policy table 64 on behalf of the first policy table 33. Further, the GW 10B of FIG. 17 is different from the GW 10 of the first embodiment in that the GW 10B has a third determination circuit 53, a threat situation management circuit 54, and a threat degree determination circuit 55 on behalf of the first determination circuit 26.

Figure 18:
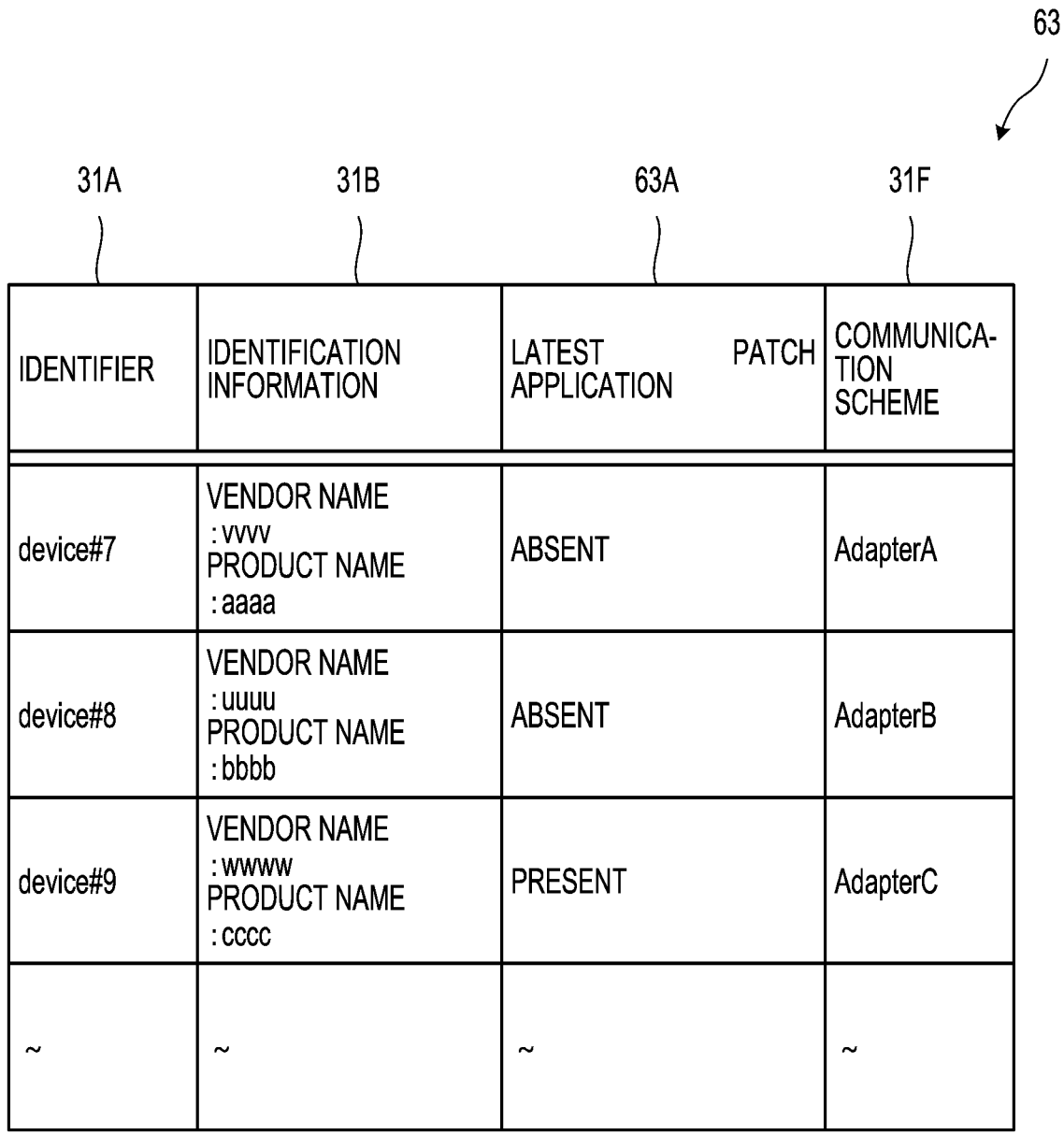
FIG. 18 is an explanatory view illustrating an example of a third device table.

FIG. 18 is an explanatory view illustrating an example of the third device table 63. The third device table 63 illustrated in FIG. 18 manages a latest patch application 63A in association with the identifier 31A, the identification information 31B, and the communication scheme 31F. The latest patch application 63A is information for identifying whether to apply the latest patch to the device 8.

Figure 19:
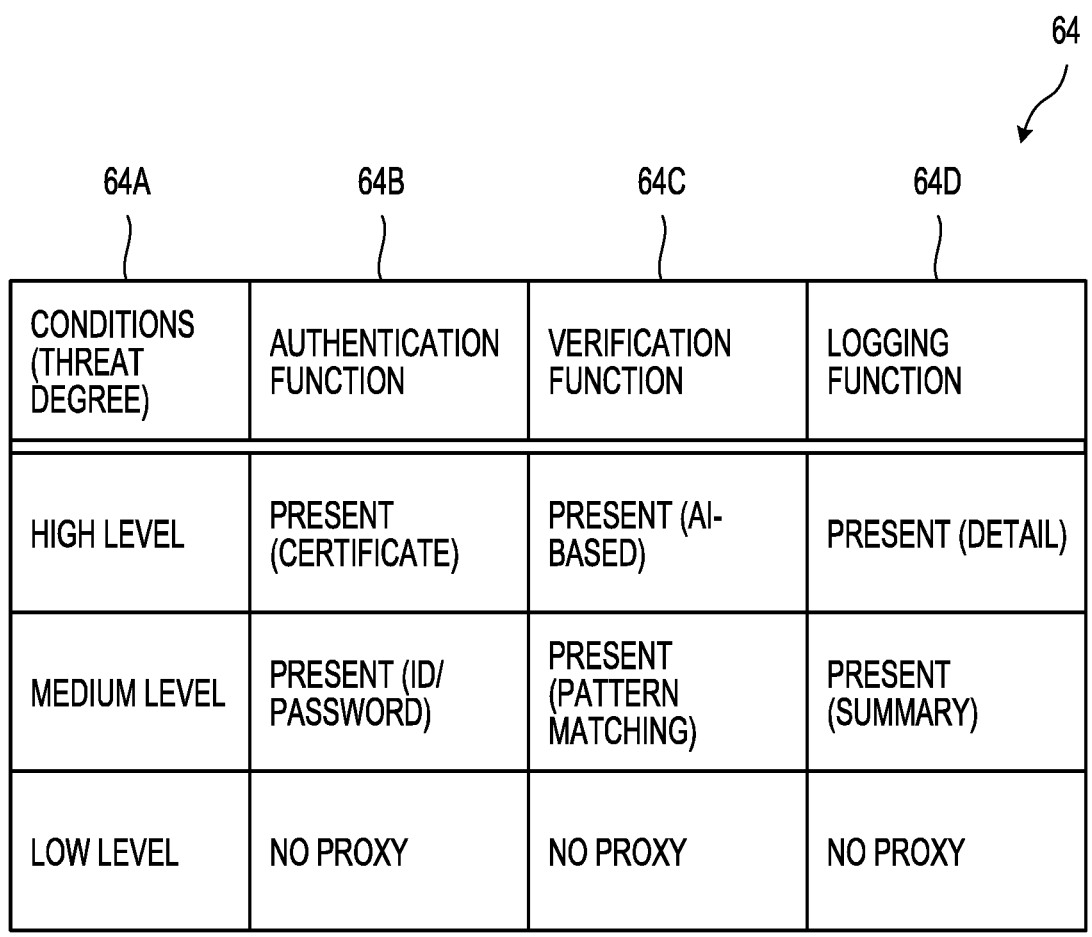
FIG. 19 is an explanatory view illustrating an example of a third policy table.

FIG. 19 is an explanatory view illustrating an example of the third policy table 64. The third policy table 64 manages an authentication function 64B, a verification function 64C, and a logging function 64D according to a threat degree 64A. The threat degree 64A is the degree of threat of the device 8 and includes, for example, three levels: a high level, a medium level, and a low level.

The threat situation management circuit 54 collects and manages information on viruses and vulnerabilities in the surrounding environments, for example, threat situations such as detection of viruses in the office area 3 and detection of new type viruses. The threat degree determination circuit 55 refers to the threat situation management circuit 54, and determines that the threat degree is the high level when a virus is detected in the office area 3 or a new type virus is detected. The threat degree determination circuit 55 determines that the threat degree in a case of no virus detection in the office area 3, no new type virus detection and no latest patch application is the medium level. The threat degree determination circuit 55 determines that the threat degree in a case of no virus detection in the office area 3, no new type virus detection and the latest patch application is the low level.

When the threat degree is the high level, the third determination circuit 53 determines that the certificate authentication as the authentication function, the AI-based verification function as the verification function and the detailed logging function as the logging function are executed by a proxy operation. When the threat degree is the medium level, the third determination circuit 53 determines that the setting ID/PW authentication as the authentication function, the pattern matching verification function as the verification function, and the summary logging function as the logging function are executed by a proxy operation. When the threat degree is the low level, the third determination circuit 53 determines that the authentication function, the verification function, and the logging function are not executed by a proxy operation. That is, the third determination circuit 53 entrusts the execution of the authentication function, the verification function, and the logging function to the device 8 itself.

Figure 20:
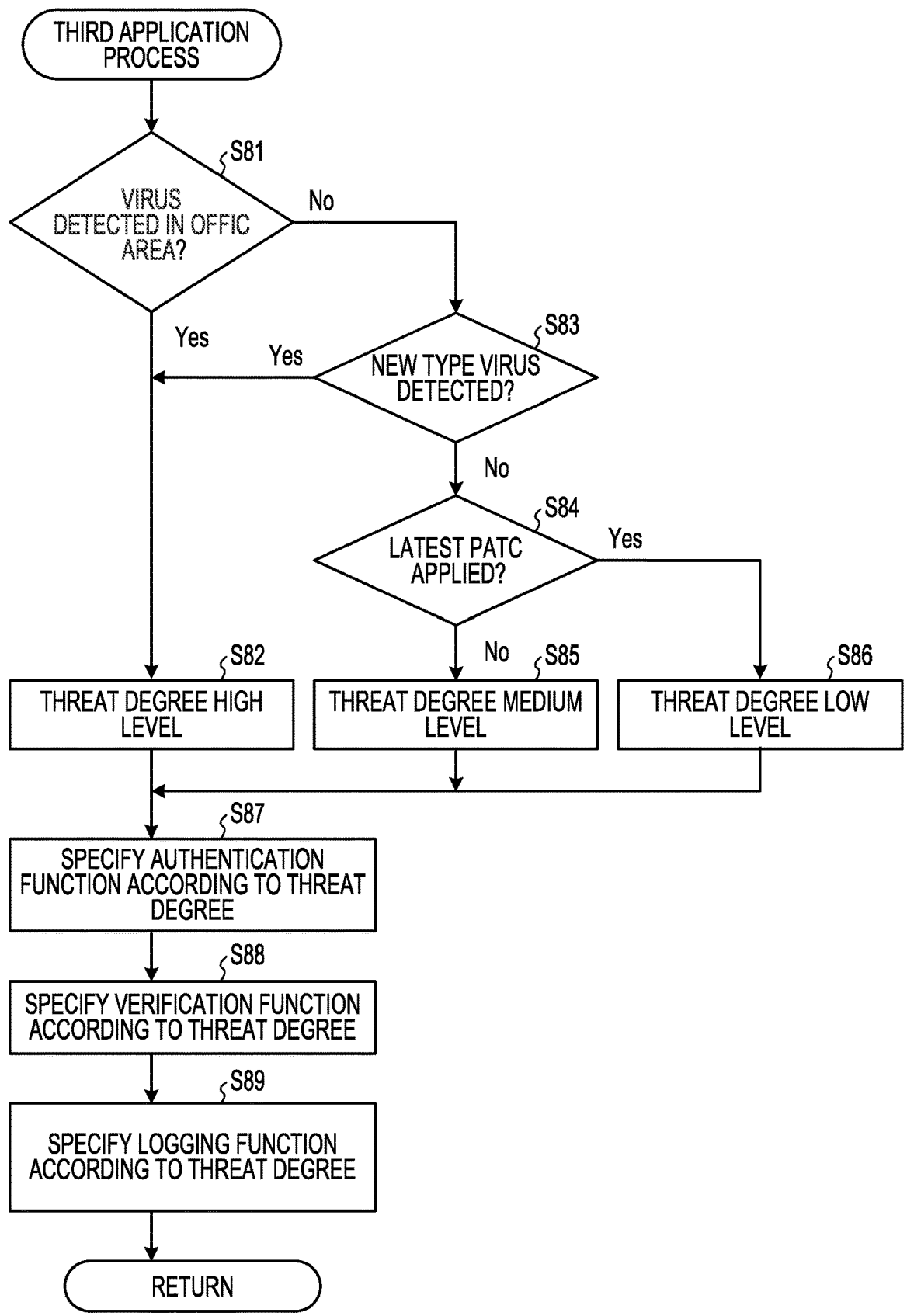
FIG. 20 is a flowchart illustrating an example of a processing operation of GW related to a third application process.

FIG. 20 is a flowchart illustrating an example of the processing operation of the GW 10B related to a third application process. The third application process is a process executed in the application process illustrated in FIG. 10. In FIG. 20, the threat degree determination circuit 55 in the GW 10B refers to the threat situation management circuit 54 to determine whether or not a virus has been detected in the office area 3 (step S81). When it is determined that a virus has been detected in the office area 3 ("Yes" in step S81), the threat degree determination circuit 55 determines that the threat degree is the high level (step S82).

When it is determined that no virus has been detected in the office area 3 ("No" in step S81), the threat degree determination circuit 55 refers to the threat situation management circuit 54 to determine whether a new type virus has been detected (step S83). When it is determined that a new type virus has been detected ("Yes" in step S83), the threat degree determination circuit 55 proceeds to step S82 to determine that the threat degree is the high level.

When it is determined that no new type virus has not been detected ("No" in step S83), the threat degree determination circuit 55 determines whether or not the latest patch is applied (step S84). When it is determined that no latest patch is applied ("No" in step S84), the threat degree determination circuit 55 determines that the threat degree is the medium level (step S85). When it is determined that the latest patch is applied ("Yes" in step S84), the threat degree determination circuit 55 determines that the threat degree is the low level (step S86).

After determining the level of the threat degree in step S82, step S85 or step S86, the third determination circuit 53 specifies the authentication function according to the threat degree (step S87). When the threat degree is the high level, the third determination circuit 53 determines that the certificate authentication is executed by a proxy operation for the device 8. When the threat degree is the medium level, the third determination circuit 53 determines that the setting ID/PW authentication is executed by a proxy operation for the device 8. When the threat degree is the low level, the third determination circuit 53 determines that the authentication function is not executed by a proxy operation. Then, the application circuit 27 applies the authentication function to the processing circuit 25 according to the threat degree. When the authentication function is not executed by a proxy operation, the application circuit 27 entrusts the execution of the authentication function to the device 8 itself.

After specifying the authentication function according to the threat degree level, the third determination circuit 53 specifies the verification function according to the threat degree level (step S88). When the importance is the high level, the third determination circuit 53 determines that the AI-based verification function is executed by a proxy operation for the device 8. When the importance level is the medium level, the third determination circuit 53 determines that the matching pattern verification function is executed by a proxy operation for the device 8. When the importance is the low level, the third determination circuit 53 determines that the verification function is not executed by a proxy operation. Then, the application circuit 27 applies the verification function to the processing circuit 25 according to the importance. When the verification function is not executed by a proxy operation, the application circuit 27 entrusts the execution of the verification function to the device 8 itself.

After specifying the verification function according to the threat degree level, the third determination circuit 53 specifies the logging function according to the threat degree level (step S89), and ends the processing operation illustrated in FIG. 20. When the importance is the high level, the third determination circuit 53 determines that the detailed logging function is executed by a proxy operation for the device 8. When the importance is the medium level, the third determination circuit 53 determines that the summary logging function is executed by a proxy operation for the device 8. When the importance is the low level, the third determination circuit 53 determines that the logging function is not executed by a proxy operation. Then, the application circuit 27 applies the logging function to the processing circuit 25 according to the importance. When the logging function is not executed by a proxy operation, the application circuit 27 entrusts the execution of the logging function to the device 8 itself.

When a virus is detected in the office area 3 or a new type virus is detected, the GW 10B determines the threat degree is the high level. When the threat degree is the high level, the GW 10B determines the authentication function, the verification function, and the logging function according to the high level are executed by a proxy operation. As a result, when the threat degree of the device 8 is the high level, the authentication function, the verification function, and the logging function of the device 8 may be strengthened.

When no new type virus is detected and the latest patch is not applied, the GW 10B determines that the threat degree is the medium level. When the threat degree is the medium level, the GW 10B determines that the authentication function, the verification function, and the logging function according to the medium level are executed by a proxy operation. As a result, when the threat degree of the device 8 is the medium level, the authentication function, the verification function, and the logging function of the device 8 may be strengthened.

When the latest patch is applied, the GW 10B determines that the threat degree is the low level. When the threat degree is the low level, the GW 10B determines that the authentication function, the verification function, and the logging function according to the low level are not executed by a proxy operation. As a result, when the threat degree of the device 8 is the low level, since the GW 10B does not uniformly execute the authentication function, the verification function, and the logging function by a proxy operation for the device 8 but entrusts the execution of the functions to the device 8 itself, it is possible to reduce the processing load on the GW 10B.

The GW 10A of the second embodiment determines that the security function of the device 8 is executed by a proxy operation according to the importance of the device 8 and the GW 10B of the third embodiment determines that the security function of the device 8 is executed by a proxy operation according to the threat degree of the device 8. However, it may be determined that the security function is executed by a proxy operation, according to the importance and the threat degree. A related fourth embodiment is described below.

Fourth Embodiment

Figure 21:
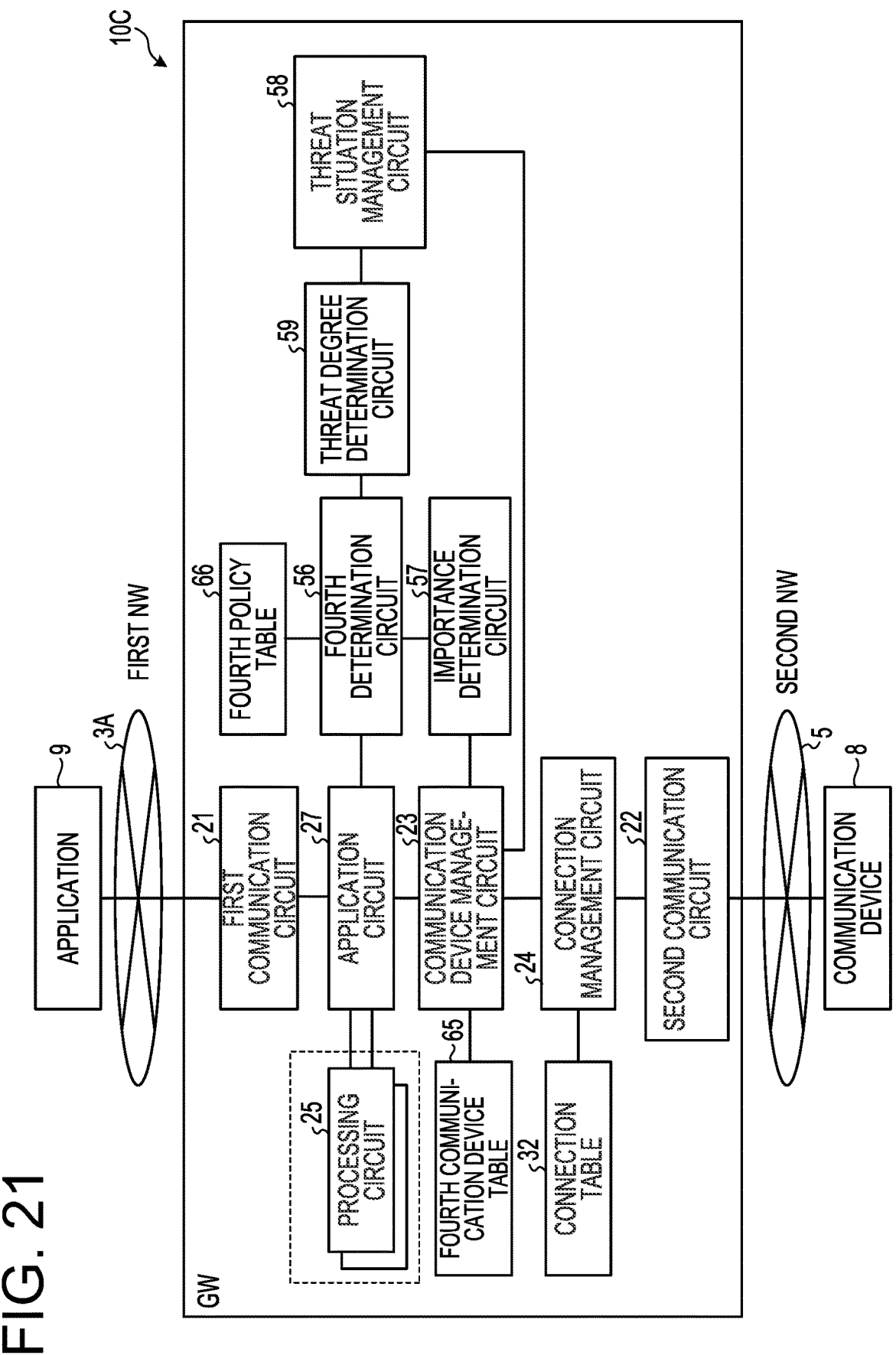
FIG. 21 is an explanatory view illustrating an example of a functional configuration of GW according to a fourth embodiment.

FIG. 21 is an explanatory view illustrating an example of a functional configuration of a GW 10C according to a fourth embodiment. The same components as those of the GW 10 of the first embodiment will be denoted by the same reference numerals, and overlapping explanation of the configuration and operation thereof will be omitted. The GW 10C illustrated in FIG. 21 is different from the GW 10 of the first embodiment in that the former has a fourth device table 65 on behalf of the first device table 31 and a fourth policy table 66 on behalf of the first policy table 33. Further, the GW 10C of FIG. 21 is different from the GW 10 of the first embodiment in that the GW 10C has a fourth determination circuit 56, an importance determination circuit 57, a threat situation management circuit 58, and a threat degree determination circuit 59 on behalf of the first determination circuit 26.

FIG. 22 is an explanatory view illustrating an example of the fourth device table 65. The fourth device table 65 illustrated in FIG. 22 manages a device type 65A, a device usage 65B, and a latest patch application 65C in association, in addition to the identifier 31A, the identification information 31B, and the communication format 31F. The device management circuit 24 updates and controls the fourth device table 65.

Figure 23:
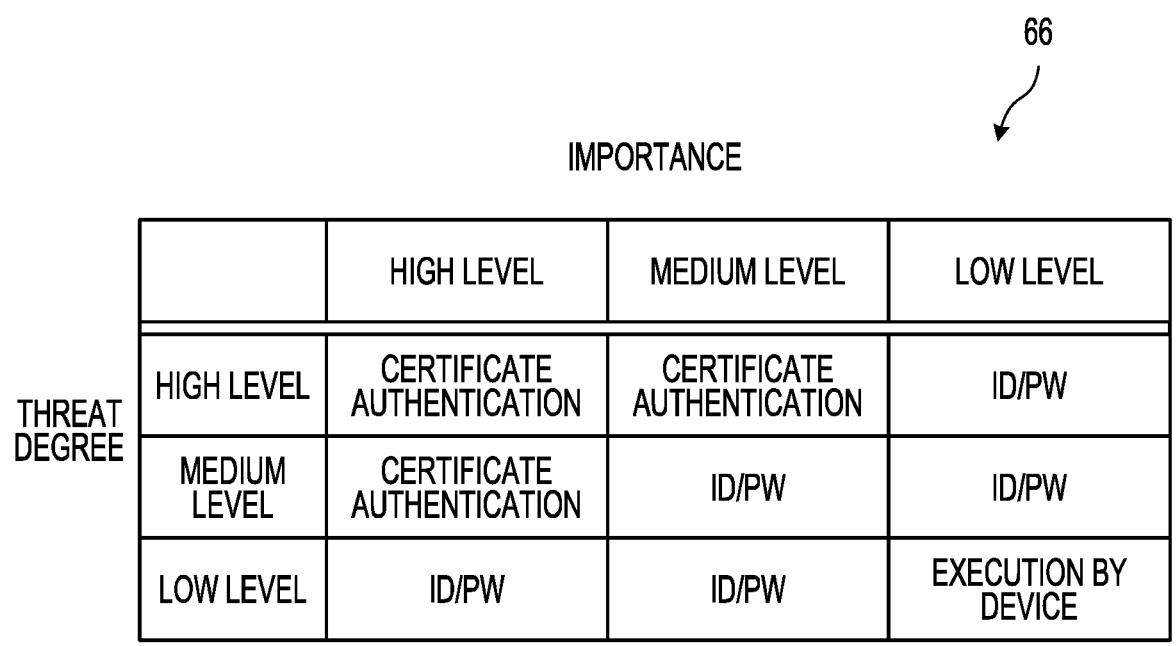
FIG. 23 is an explanatory view illustrating an example of a fourth policy table.

FIG. 23 is an explanatory view illustrating an example of the fourth policy table 66. The fourth policy table 66 manages the authentication function, the verification function, and the logging function according to the importance and the threat degree. The importance is the importance of the device 8 and includes, for example, three levels: a high level, a medium level, and a low level. The threat degree is the threat degree of the device 8 and includes, for example, three levels: a high level, a medium level, and a low level. Although the fourth policy table 66 illustrated in FIG. 23 exemplifies the policy of the authentication function for the sake of convenience of explanation, the policies of the verification function and the logging function may be also managed according to the importance and the threat degree.

When an access to the device 8 is detected, the importance determination circuit 57 refers to the device type 65A and the device usage 65B in the fourth device table 65 to determine the importance of the device 8 according to the device type 65A and the device usage 65B of the access destination device 8. When the device type of the access destination device 8 is an actuator, the importance determination circuit 57 determines that the importance of the device 8 is the high level. When the device type of the access destination device 8 is not an actuator and the device usage is a control system, the importance determination circuit 57 determines that the importance of the device 8 is the medium level. When the device type of the access destination device 8 is not an actuator and the device usage is not a control system, the importance determination circuit 57 determines that the importance of the device 8 is the low level.

The threat situation management circuit 58 collects and manages information on viruses and vulnerabilities in the surrounding environments, for example, threat situations such as detection of viruses in the office area 3 and detection of new type viruses. The threat degree determination circuit 59 refers to the threat situation management circuit 58 and determines that the threat degree is the high level when a virus is detected in the office area 3 or a new type virus is detected. The threat degree determination circuit 59 determines that the threat degree in a case of no virus detection in the office area 3, no new type virus detection and no latest patch application is the medium level. The threat degree determination circuit 59 determines that the threat degree in a case of no virus detection in the office area 3, no new type virus detection and the latest patch application is the low level.

The fourth determination circuit 56 refers to the fourth policy table 66 and determines that the certificate authentication is executed by a proxy operation for the device 8 when both the importance and the threat degree are the high level. When the importance is the medium level and the threat degree is the high level, the fourth determination circuit 56 determines that the certificate authentication is executed by a proxy operation for the device 8. When both the importance and the threat degree are the low level, the fourth determination circuit 56 determines that the authentication function is not executed by a proxy operation, that is, the authentication function is executed by the device 8.

Figure 24:
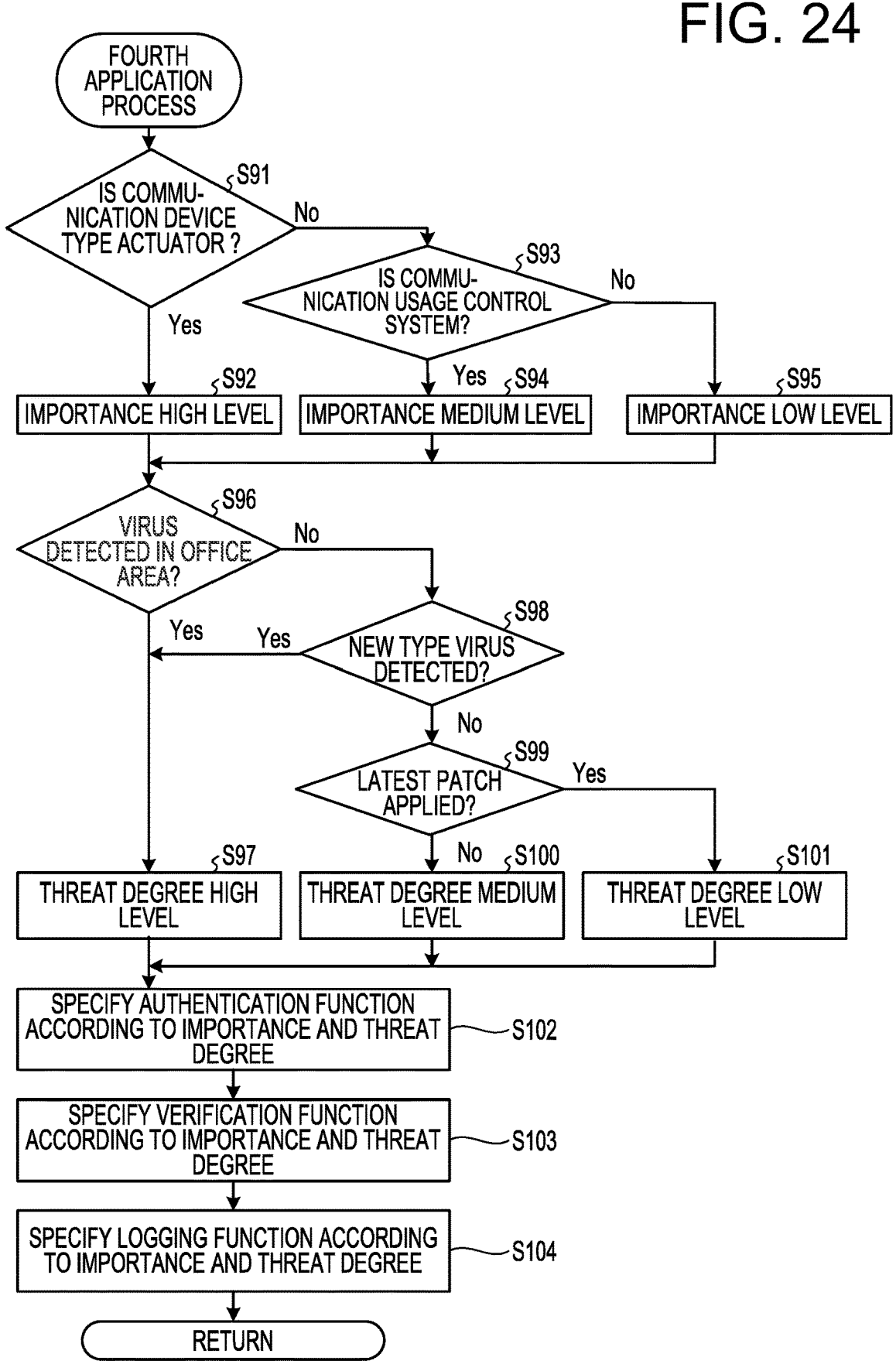
FIG. 24 is a flowchart illustrating an example of a processing operation of GW related to a fourth application process.

FIG. 24 is a flowchart illustrating an example of the processing operation of the GW 10C related to a fourth application process. The fourth application process is a process executed in the application process illustrated in FIGS. 10A and 10B. The importance determination circuit 57 in the GW 10C refers to the device type 65A corresponding to the identifier 31A of the access destination device 8 in the fourth device table 65, to determine whether or not the device type 65A is an actuator (step S91). When it is determined that the device type 65A is the actuator ("Yes" in step S91), the importance determination circuit 57 determines that the importance is the high level (step S92).

When it is determined that the device type 65A is not an actuator ("No" in step S91), the importance determination circuit 57 determines whether or not the device usage 65B corresponding to the identifier 31A of the access destination device 8 is a control system (step S93). When it is determined that the device usage 65B is the control system ("Yes" in step S93), the importance determination circuit 57 determines that the importance is the medium level (step S94). When it is determined that the device usage 65B is not a control system ("No" in step S93), the importance determination circuit 57 determines that the importance is the low level (step S95).

After determining the importance in step S92, step S94 or step S95, the threat degree determination circuit 59 refers to the threat situation management circuit 58 to determine whether or not a virus has been detected in the office area 3 (step S96). When it is determined that a virus has been detected in the office area 3 ("Yes" in step S96), the threat degree determination circuit 59 determines that the threat degree is the high level (step S97). When it is determined that no virus has been detected in the office area 3 ("No" in step S96), the threat degree determination circuit 59 refers to the threat situation management circuit 58 to determine whether or not a new type virus has been detected (step S98). When it is determined that a new type virus has been detected ("Yes" in step S98), the threat degree determination circuit 59 proceeds to step S97 to determine that the threat degree is the high level.

When it is determined that no new type virus has not been detected ("No" in step S98), the threat degree determination circuit 59 determines whether or not there is the latest patch application 65C corresponding to the identifier 31A in the fourth device table 65 (step S99). When it is determined that there is no latest patch application ("No" in step S99), the threat degree determination circuit 59 determines that the threat degree is the medium level (step S100). When it is determined that there is the latest patch application ("Yes" in step S99), the threat degree determination circuit 59 determines that the threat degree is the low level (step S101).

After determining the level of the threat degree in step S97, step S100 or step S101, the fourth determination circuit 56 refers to the fourth policy table 66 to specify the authentication function according to the importance and the threat degree (step S102). After determining the authentication function according to the importance and the threat degree, the fourth determination circuit 56 specifies the verification function according to the importance and the threat degree (step S103). After determining the verification function according to the importance and the threat degree, the fourth determination circuit 56 specifies the logging function according to the importance and the threat degree (step S104) and ends the processing operation illustrated in FIG. 24.

When both the importance and the threat degree are the high level, the GW 10C determines that the authentication function, the verification function, and the logging function are executed by a proxy operation. As a result, when the importance and the threat degree of the device 8 are the high levels, the authentication function, the verification function, and the logging function of the device 8 may be strengthened.

When both the importance and the threat degree are the low level, the GW 10C determines that the authentication function, the verification function, and the logging function are not executed by a proxy operation. As a result, when the importance and the threat degree of the device 8 are the low level, the GW 10C does not uniformly execute the authentication function, the verification function, and the logging function by a proxy operation but entrusts the execution of the functions to the device 8 itself, it is possible to reduce the processing load on the GW 10C.

In addition, the GW 10C determines the importance and threat degree as the authentication function, the verification function, and the logging function of each level. As a result, the authentication function, the verification function and the logging function of the device 8 may be strengthened according to the importance and the threat degree of the device 8.

Although the GW 10C of the fourth embodiment determines that the security function of the device 8 is executed by a proxy operation according to the importance and the threat degree, the rank of the security function may be changed or may be appropriately changed according to the load situation of the GW 10C. A related fifth embodiment is described below.

Fifth Embodiment

Figure 25:
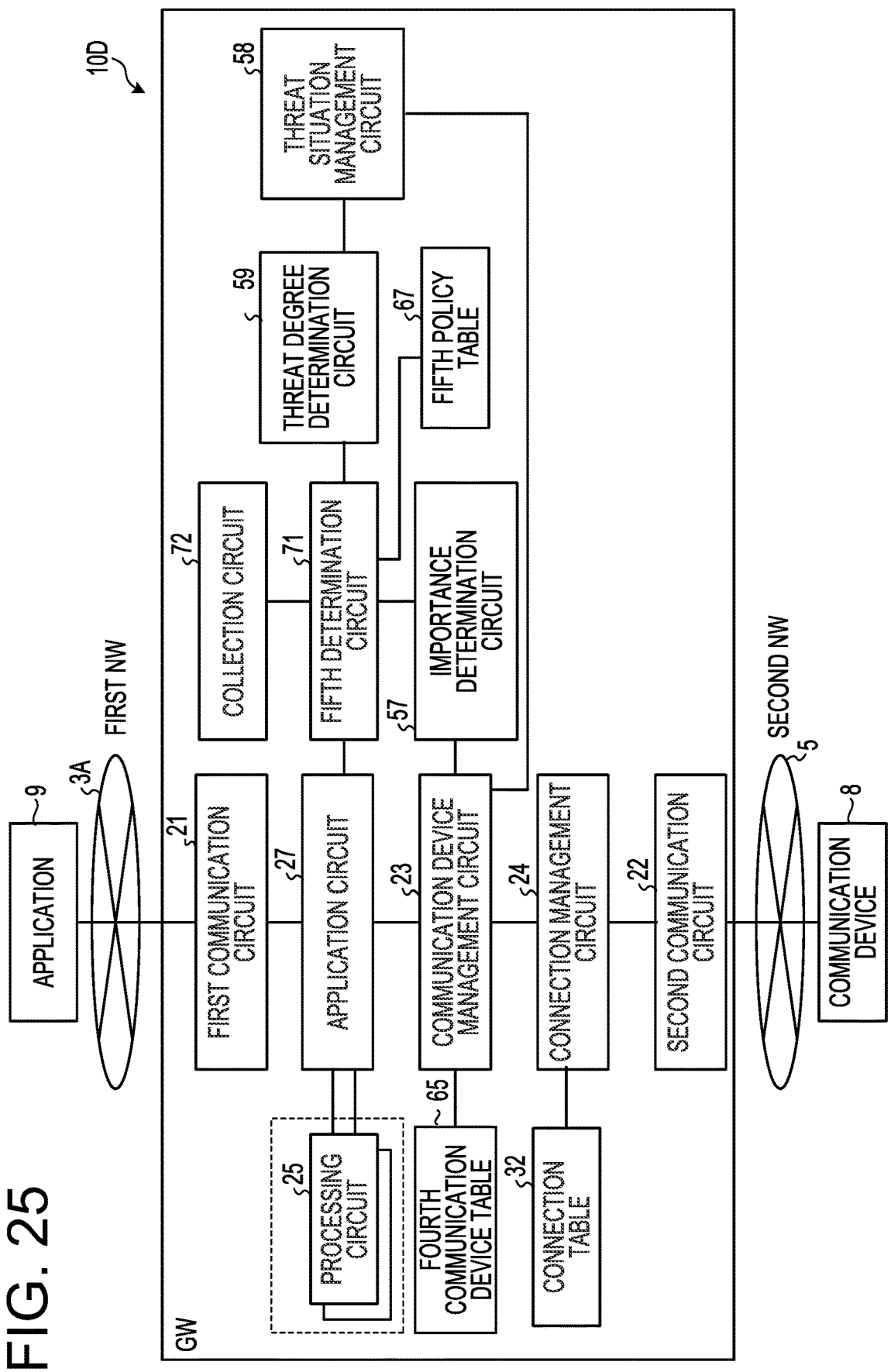
FIG. 25 is an explanatory view illustrating an example of a functional configuration of GW according to a fifth embodiment.

FIG. 25 is an explanatory view illustrating an example of a functional configuration of a GW 10D according to a fifth embodiment. The same components as those of the GW 10C of the fourth embodiment will be denoted by the same reference numerals, and overlapping explanation of the configuration and operation thereof will be omitted. The GW 10D illustrated in FIG. 25 is different from the GW 10C of the fourth embodiment in that the former has a fifth policy table 67 on behalf of the fourth policy table 64, and a fifth determination circuit 71 and a collection circuit 72 on behalf of the fourth determination circuit 56. The collection circuit 72 collects the load state of the GW 10D, for example, the request frequency, the CPU usage rate, and the memory usage rate.

When the request frequency exceeds 100 requests per second, the CPU usage rate exceeds 80%, and the memory usage rate exceeds 90%, the fifth determination circuit 71 determines that the load state of the GW 10D is abnormal. Otherwise, it is determined that the load state of the GW is normal. The fifth determination circuit 71 changes the policy used for the authentication function, the verification function, and the logging function according to the abnormal or normal state.

FIG. 26 is an explanatory view illustrating an example of the fifth policy table 67. The fifth policy table 67 manages the authentication function, the verification function, and the logging function according to the load state, the importance, and the threat degree. The importance is the importance of the device 8 and includes, for example, three levels: a high level, a medium level, and a low level. The threat degree is the threat degree of the device 8 and includes, for example, three levels: a high level, a medium level, and a low level. The load state includes two states: a normal state and an abnormal state. Although the fifth policy table 67 exemplifies the policy of the authentication function for the sake of convenience of explanation, the policies of the verification function and the logging function may also be managed according to the load state, the importance, and the threat degree.

The fifth determination circuit 71 refers to the fifth policy table 67 to determine that the certificate authentication is executed by a proxy operation for the device 8 when the load state is the normal state and both the importance and the threat degree are the high level. When the load state is the normal state, the importance is the medium level, and the threat degree is the high level, the fifth determination circuit 71 determines that the certificate authentication is executed by a proxy operation for the device 8. When the load state is the normal state and both the importance and the threat degree are the low level, the fifth determination circuit 71 determines that the authentication function is not executed by a proxy operation.

Further, the fifth determination circuit 71 refers to the fifth policy table 67 to determine that the certificate authentication is executed by a proxy operation for the device 8 when the load state is the abnormal state and both the importance and the threat degree are the high level. When the load state is the abnormal state, the importance is the medium level and the threat degree is the high level, the fifth determination circuit 71 determines that the setting ID/PW authentication is executed by a proxy operation for the device 8. When the load state is the abnormal state and both the importance and the threat degree are the low level, the fifth determination circuit 71 determines that the authentication function is not executed by a proxy operation. For example, when the authentication functions are ranked, the certificate authentication is set to the highest order, the setting ID/PW authentication is set to the next order, and no proxy operation is set to the next order. That is, when the load state of the GW 10D is the abnormal state, the fifth determination circuit 71 lowers the rank of the authentication functions by one as compared with the normal state, thereby reducing the processing load required for the proxy operation of the security function of the GW 10D. By lowering the rank by one, for example, when the certificate authentication is executed by a proxy operation in the normal state, it is determined that the setting ID/PW authentication is executed by a proxy operation in the abnormal state. Further, for example, when the setting ID/PW authentication is executed by a proxy operation in the normal state, it is determined that the setting ID/PW authentication is not executed by a proxy operation in the abnormal state.

Figure 27A:
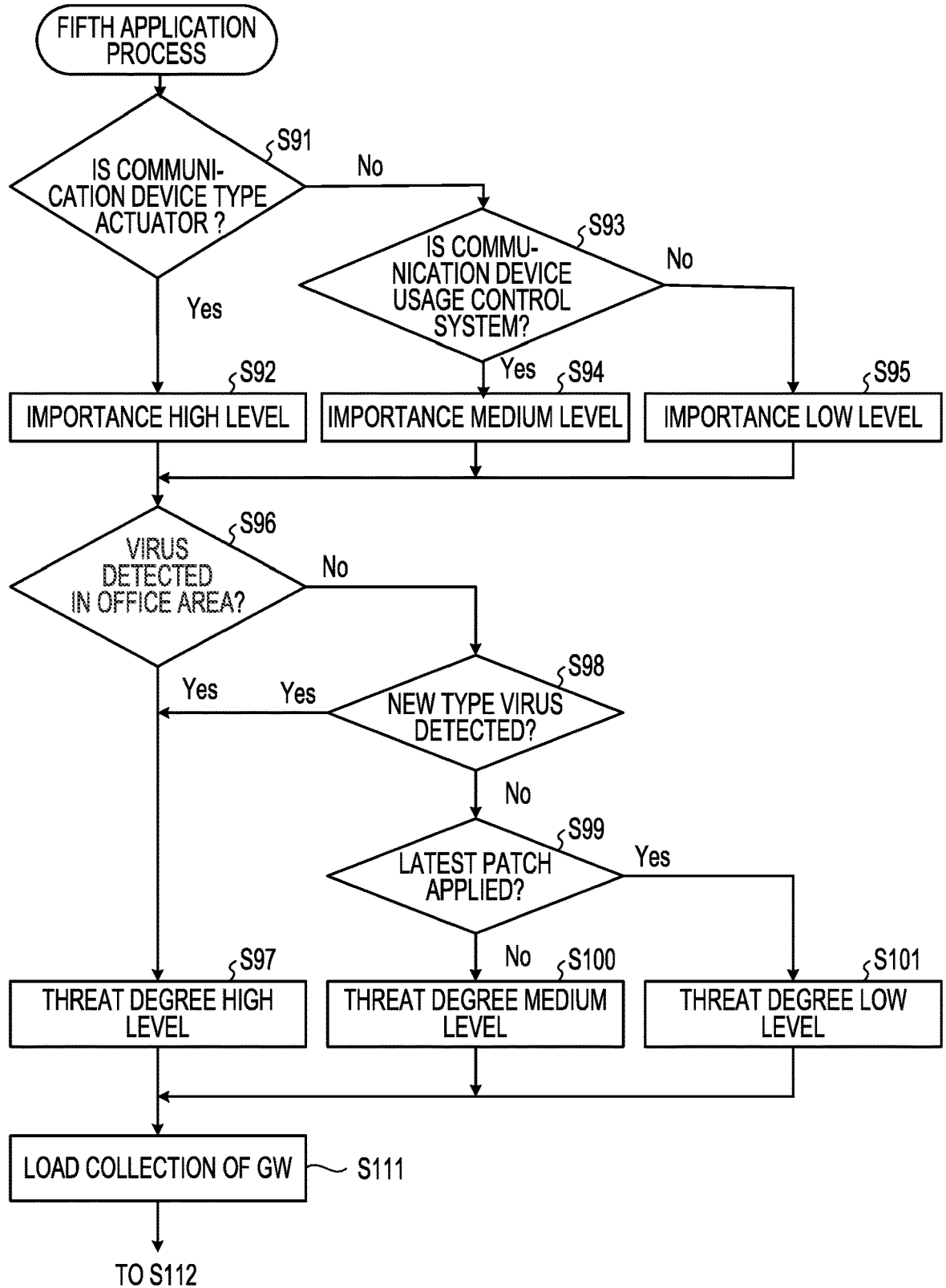
FIGS. 27A and 27B are flowcharts illustrating an example of a processing operation of GW related to a fifth application process.
Figure 27B:
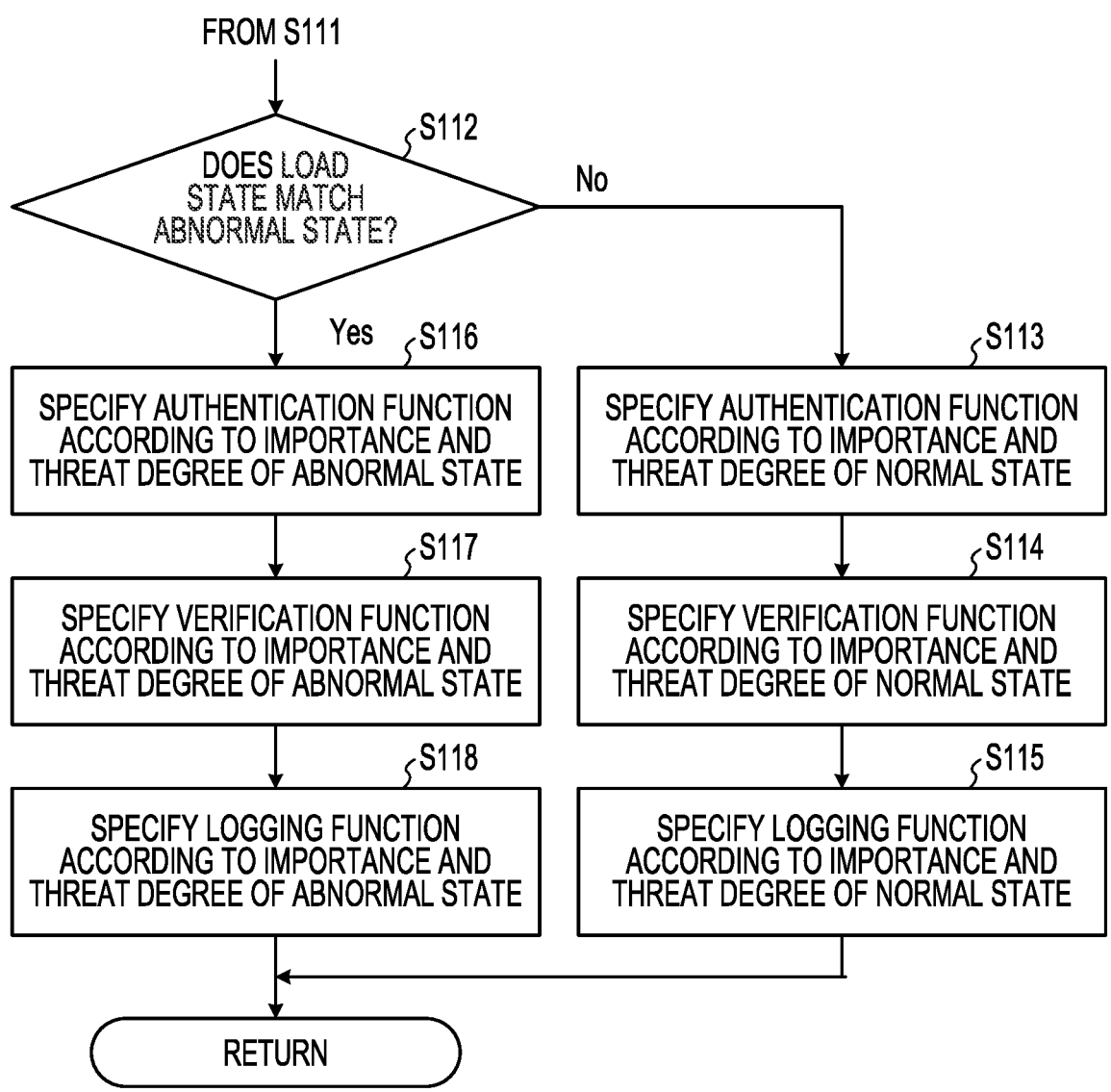

FIGS. 27A and 27B are flowcharts illustrating an example of the processing operation of the GW 10D related to a fifth application process. The fifth application process is a process executed in the application process illustrated in FIGS. 10A and 10B. In FIGS. 27A and 27B, the GW 10D determines the importance and the threat degree through steps S91 to S101. After determining the importance and the threat degree, the fifth determination circuit 71 in the GW 10D collects the load state of the GW 10D through the collection circuit 72 (step S111). The fifth determination circuit 71 determines whether or not the load state matches the abnormal state (step S112).

When it is determined that the load state does not match the abnormal state ("No" in step S112), the fifth determination circuit 71 determines that the load state is the normal state. Then, the fifth determination circuit 71 specifies the authentication function according to the importance and the threat degree of the normal state (step S113). The fifth determination circuit 71 refers to the fifth policy table 67 to determine the authentication function according to the importance and the threat degree of the normal state.

After identifying the authentication function, the fifth determination circuit 71 specifies the verification function according to the importance and the threat degree of the normal state (step S114). The fifth determination circuit 71 determines the verification function according to the importance and the threat degree of the normal state. After specifying the verification function, the fifth determination circuit 71 specifies the logging function according to the importance and the threat degree of the normal state (step S115) and ends the processing operation illustrated in FIGS. 27A and 27B. The fifth determination circuit 71 determines the logging function according to the importance and the threat degree of the normal state.

When it is determined that the load state matches the abnormal state ("Yes" in step S112), the fifth determination circuit 71 specifies the authentication function according to the importance and the threat degree of the abnormal state (Step S116). The fifth determination circuit 71 refers to the fifth policy table 67 to determine the authentication function according to the importance and the threat degree of the abnormal state. After specifying the authentication function, the fifth determination circuit 71 specifies the verification function according to the importance and the threat degree of the abnormal state (step S117). The fifth determination circuit 71 determines the verification function according to the importance and the threat degree of the abnormal state. After specifying the verification function, the fifth determination circuit 71 specifies the logging function according to the importance and the threat degree of the abnormal state (step S118) and ends the processing operation illustrated in FIGS. 27A and 27B. The fifth determination circuit 71 determines the logging function according to the importance and the threat degree of the abnormal state.

When the load state is the normal state, the GW 10D determines the authentication function, the verification function, and the logging function according to the importance and the threat degree. Meanwhile, when the load state is the abnormal state, the GW 10D determines that the rank of the authentication function, the verification function, and the logging function is lowered by one, except for a case where both the importance and the threat degree are the high level or the low level. As a result, when the processing load on the GW 10D is abnormal, it is possible to strengthen the security function of the device 8 while reducing the processing load.

In the GW systems 1 of the first to fifth embodiments, it is determined whether or not the security function is executed by a proxy operation according to the security-related characteristics. However, even when the security function is strengthened, it may be assumed that the device 8 causes an abnormal communication. A sixth embodiment for coping with such a situation is described below.

Sixth Embodiment

Figure 28:
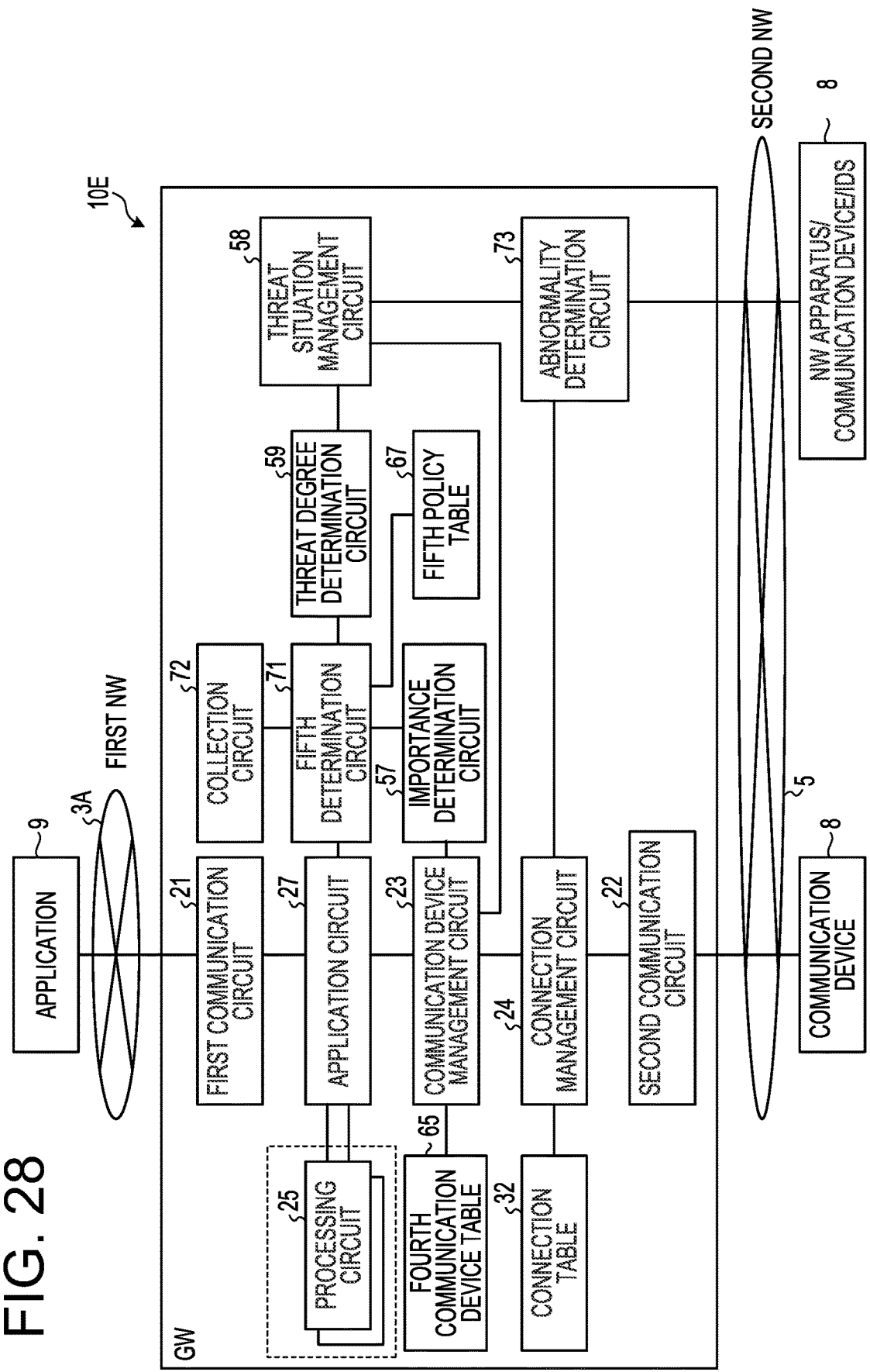
FIG. 28 is an explanatory view illustrating an example of a functional configuration of GW according to a sixth embodiment.

FIG. 28 is an explanatory view illustrating an example of a functional configuration of a GW 10E according to a sixth embodiment. The same components as those of the GW 10D of the fifth embodiment will be denoted by the same reference numerals, and overlapping explanation of the configuration and operation thereof will be omitted. The GW 10E illustrated in FIG. 28 is different from the GW 10D of the fifth embodiment in that the former has an abnormality determination circuit 73 that refers to a traffic state to determine whether there is a device 8 in abnormal communication. The abnormality determination circuit 73 may use, for example, the result of an IDS (Intrusion Detection System) product. The abnormal communication may include, for example, a DoS attack that repeatedly transmits a large amount of data in a short time, a transmission of a packet that is not originally used, and an access to an NW device or a port that is not originally accessed.

When a device 8 in abnormal communication which is a type of threat situation in the field area 3 is detected, the abnormality determination circuit 73 notifies the threat situation management circuit 58 of the device 8 in abnormal communication as the threat situation, and also notifies the connection management circuit 24 of the device 8 in abnormal communication. The connection management circuit 24 acquires the identifier 32A from the connection table 32 according to the address 32B of the device 8 in abnormal communication.

The device management circuit 23 determines whether or not the identifier 31A of the abnormal communication device 8 is present in the fourth device table 65. When it is determined that the identifier 31A of the abnormal communication device 8 is present in the fourth device table 65, the device management circuit 23 deletes the record of the device 8 corresponding to the identifier 31A from the fourth device table 65. Further, the connection management circuit 24 deletes the record corresponding to the identifier 32A of the abnormal communication device 8 from the connection table 32. As a result, since the record of the identifier 31A of the device 8 in the abnormal state is deleted from the fourth device table 65 and the connection table 32, it is possible not only to prevent the security function of the abnormal communication device 8 from being executed by a proxy operation but also to make the communication to the abnormal communication device 8 disable.

Figure 29:
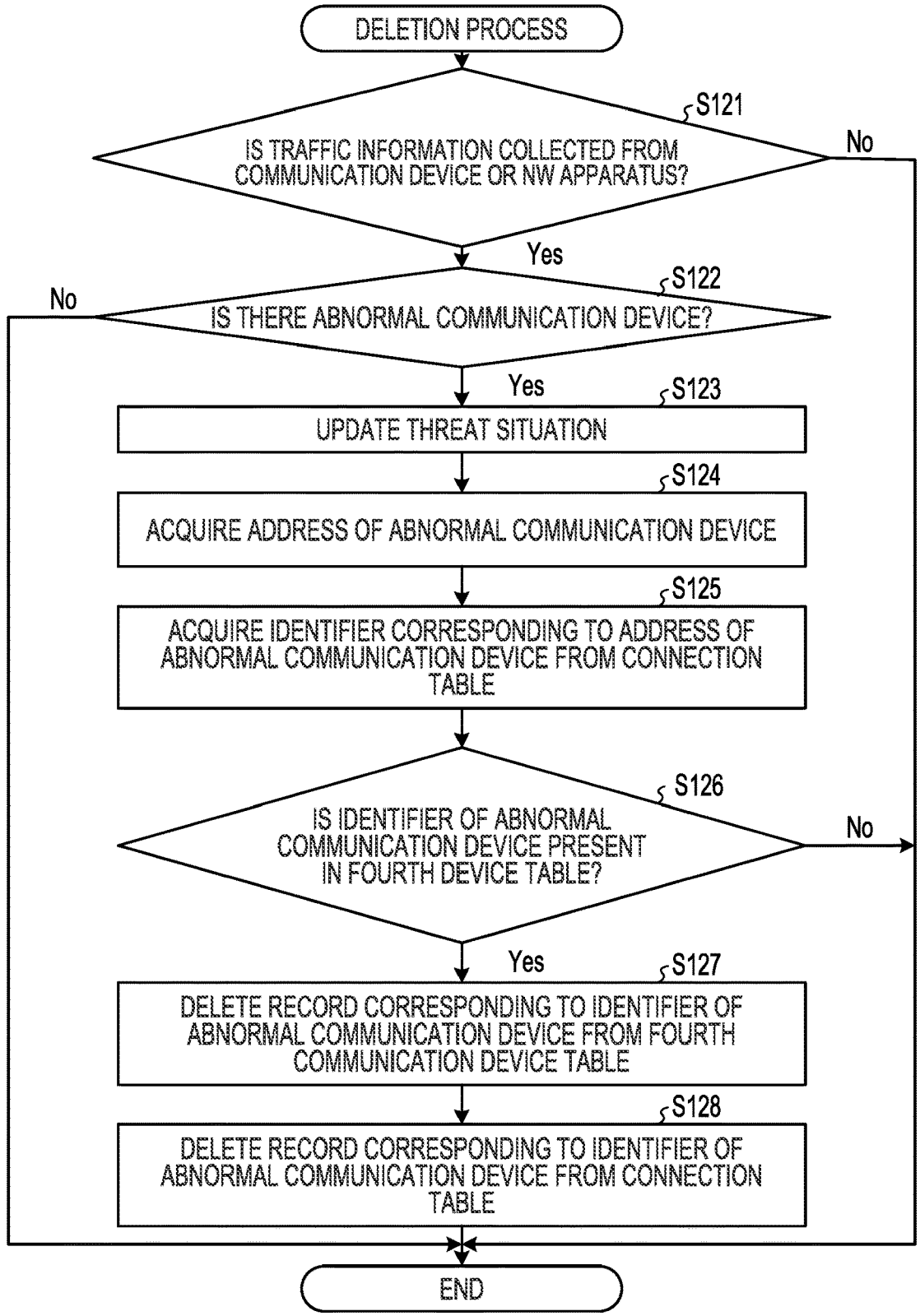
FIG. 29 is a flowchart illustrating an example of a processing operation of GW related to a deletion process.

FIG. 29 is a flowchart illustrating an example of the processing operation in the GW 10E related to a deletion process. In FIG. 29, the abnormality determination circuit 73 in the GW 10E determines whether or not the traffic information of each device 8 has been collected (step S121). When it is determined that the traffic information of the device 8 has been collected ("Yes" in step S121), the device management circuit 23 determines whether or not there is an abnormal communication device 8 (step S122). When it is determined that there is an abnormal communication device 8 ("Yes" in step S122), the abnormality determination circuit 73 updates the threat situation of abnormal communication into the threat situation management circuit 58 (step S123).

After updating the abnormal communication threat situation, the abnormality determination circuit 73 acquires an address of the abnormal communication device 8 (step S124). The connection management circuit 24 acquires the identifier 32A corresponding to the address 32B of the abnormal communication device 8 from the connection table 32 (step S125). The device management circuit 23 determines whether or not the identifier 31A of the abnormal communication device 8 is present in the fourth device table 65 (step S126).

When it is determined that the identifier 31A of the abnormal communication device 8 is present in the fourth device table 65 ("Yes" in step S126), the device management circuit 23 deletes the record corresponding to the identifier 31A of the abnormal communication device 8 from the fourth device table 65 (step S127). Further, the connection management circuit 24 deletes the record corresponding to the identifier 31A of the abnormal communication device 8 from the connection table 32 (step S128) and ends the processing operation illustrated in FIG. 29.

When it is determined that the traffic information of the device 8 has not been collected ("No" in step S121), the abnormality determination circuit 73 ends the processing operation illustrated in FIG. 29. When it is determined that there is no abnormal communication device 8 ("No" in step S122), the abnormality determination circuit 73 ends the processing operation illustrated in FIG. 29. When it is determined that the identifier 31A of the abnormal communication device 8 is not present in the fourth device table 65 ("No" in step S126), the device management circuit 23 ends the processing operation illustrated in FIG. 29.

When the device in the abnormal communication is detected, the GW 10E deletes the record corresponding to the identifier of the abnormal communication device from the fourth device table 65 and the connection table 32. As a result, since there is no record of the abnormal communication device 8 in the fourth device table 65 and the connection table 32, the GW 10E may prevent the security function for the abnormal communication device 8 from being executed by a proxy operation. Even when security measures are executed, for example, the device 8 may be altered by being directly accessed by a serial cable, and may be infected with malware. However, when abnormal communication is detected in the device 8, in the GW 10E, since the record of the abnormal communication device 8 is deleted from the fourth device table 65 and the connection table 32, an identifier error is returned to the application 9. As a result, by making the use of the device 8 from the application 9 impossible, the application 9 is not damaged.

The constituent elements of the illustrated parts are not necessarily physically configured as illustrated. In other words, the specific forms of distribution and integration of the parts are not limited to those illustrated, and all or some thereof may be distributed or integrated functionally or physically in arbitrary units according to, for example, various loads or usage conditions.

The various processing functions performed by the respective devices may be entirely or partially executed on a CPU (Central Processing Unit) (or a microcomputer such as an MPU (Micro Processing Unit) or an MCU (Micro Controller Unit)). In addition, the various processing functions may be entirely or partially executed on a program analyzed and executed by a CPU (or a microcomputer such as an MPU or an MCU) or on hardware by a wired logic.

Figure 30:
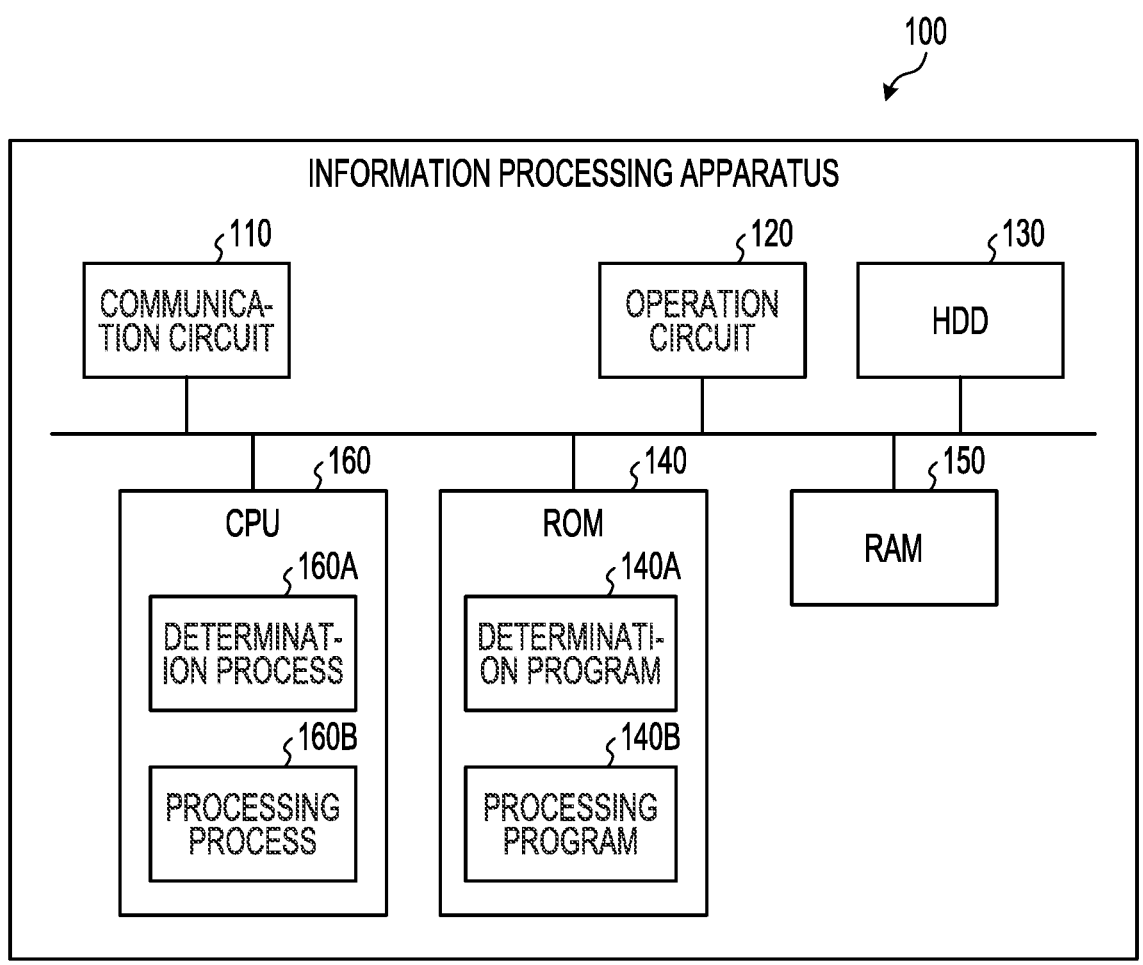
FIG. 30 is an explanatory view illustrating an example of an information processing apparatus that executes a communication control program.

The various processes described in the above embodiments are implemented by executing a prepared program in an information processing apparatus. Hereinafter, an example of an information processing apparatus that executes a program having the same functions as the above embodiments will be described. FIG. 30 is an explanatory view illustrating an example of an information processing apparatus that executes a communication control program.

An information processing apparatus 100 that executes the communication control program illustrated in FIG. 30 includes a communication circuit 110, an operation circuit 120, an HDD 130, a ROM 140, a RAM 150, and a CPU 160. The information processing apparatus 100 is, for example, an apparatus having a communication function for controlling a communication with a device (not illustrated).

The communication control program that exhibits the same functions as the above embodiments is stored in advance in the ROM 140. Instead of the ROM 140, the communication control program may be recorded on a readable recording medium in a drive (not illustrated). Examples of the recording medium may include, for example, portable recording media such as a CD-ROM, a DVD disk, a USB memory, and an SD card, and a semiconductor memory such as a flash memory. As illustrated in FIG. 30, the communication control program includes a determination program 140A and a processing program 140B which may be appropriately integrated or distributed.

The CPU 160 reads out these programs 140A and 140B from the ROM 140 and deploys the read programs on the work area of the RAM 150. As illustrated in FIG. 30, the CPU 160 functions the programs 140A and 140B deployed on the RAM 150 as a determination process 160A and a processing process 160B, respectively. The RAM 150 includes a first memory that stores device-related characteristics and a second memory that stores executable security functions for the device-related characteristics.

When a communication access to a device is detected, the CPU 160 refers to the first memory storing the device-related characteristics to specify the device-related characteristics corresponding to the device. The CPU 160 refers to the second memory storing the executable security functions for the device-related characteristics to determine a security function corresponding to the specified device-related characteristics. The CPU 160 executes the determined security function for the device in communication access. As a result, it is possible to reduce the processing load while ensuring the security function for the device access.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A communication control method executed by a processor included in a communication control device that controls communication with a communication device, the method comprising:
  when a communication access to the communication device is detected, specifying a security-related characteristic corresponding to the communication device by referring to a first memory that stores relationships between communication devices and security-related characteristics respectively, the security-related characteristic including presence or absence of a security function for the communication device, and types of the security function set in the communication device in a case where the security function exists in the communication device;
  determining the security function corresponding to the specified security-related characteristic by referring to a second memory that stores relationships between executable security functions and the security-related characteristics respectively; and
  executing the security function determined at the determining for the communication device of the communication access,
  wherein the determining the security function includes determining an importance of the communication device that varies according to both a type of the communication device and usage of the communication device in the security-related characteristic and determining the security function corresponding to a combination of the importance of the communication device and a threat degree that varies according to a degree of influence on communication to the communication device in the related characteristic.

2. The communication control method according to claim 1, wherein the determining the security function includes:
   collecting load information of the communication control device, and
   changing a rank of the security function according to the collected load information.

3. The communication control method according to claim 1, further comprising when an abnormal communication related to the communication device is detected, deleting a record corresponding to the communication device related to the abnormal communication from the first memory and the second memory.

4. A communication control device that controls communication with a communication device, the communication control device comprising:
   a first memory configured to store communication device-related characteristics, the communication device-related characteristics each including presence or absence of a security function for the communication device, and details types of the security function set in the communication device in a case where the security function exists in the communication device;
   a second memory configured to store executable security functions for the communication device-related characteristics;
   a processor coupled to the first memory and the second memory, and configured to:
   detect a communication access to the communication device,
   specify the related characteristic corresponding to the communication device by referring to the first memory, and
   determine the security function corresponding to the specified related characteristic by referring to the second memory,
   wherein, in determining the security function, the processor determines an importance of the communication device that varies according to both a type of the communication device and usage of the communication device in the specified related characteristic and determines the security function corresponding to a combination of the importance of the communication device and a threat degree that varies according to a degree of influence on communication to the communication device in the related characteristic; and
   a processing circuit configured to execute the determined security function for the communication device of the communication access.

5. The communication control device according to claim 4, wherein the processor is configured to when the processor detects an abnormal communication related to the communication device, delete a record corresponding to the communication device related to the abnormal communication from the first memory and the second memory.

6. A non-transitory computer-readable recording medium storing a program that causes a processor included in a communication control device to execute a process for controlling a communication with a communication device, the process comprising:
   when a communication access to the communication device is detected, specifying a related characteristic corresponding to the communication device by referring to a first memory that stores communication device-related characteristics, the communication device-related characteristics each including presence or absence of a security function for the communication device, and details types of the security function set in the communication device in a case where the security function exists in the communication device;
   determining the security function corresponding to the specified related characteristic by referring to a second memory that stores executable security functions for the communication device-related characteristics; and
   executing the security function determined at the determining for the communication device of the communication access,
   wherein the determining the security function includes determining an importance of the communication device that varies according to both a type of the communication device and usage of the communication device in the specified related characteristic and determining the security function corresponding to a combination of the importance of the communication device and a threat degree that varies according to a degree of influence on communication to the communication device in the related characteristic.

7. The computer-readable recording medium according to claim 6, wherein the determining the security function includes:
   collecting load information of the communication control device, and
   changing a rank of the security function according to the collected load information.

8. The computer-readable recording medium according to claim 6, further comprising when an abnormal communication related to the communication device is detected, deleting a record corresponding to the communication device related to the abnormal communication from the first memory and the second memory.

* * * * *